US012669726B2

(12) United States Patent
Eash et al.

(10) Patent No.: US 12,669,726 B2
(45) Date of Patent: Jun. 30, 2026

(54) LIGHT ENGINE USING A POLARIZATION SPLITTING LENS UNIT FOR EXIT PUPIL ILLUMINATION

(71) Applicant: Avegant Corp., San Mateo, CA (US)

(72) Inventors: Aaron Matthew Eash, San Francisco, CA (US); Andrew John Gross, Chassell, MI (US); Rohit Prakash, San Jose, CA (US); Edward Chia Ning Tang, Menlo Park, CA (US); Warren Cornelius Welch, III, Foster City, CA (US); Christopher David Westra, San Carlos, CA (US)

(73) Assignee: Avegant Corp., San Mateo, CA (US)

( * ) Notice: Subject to any disclaimer, the term of this patent is extended or adjusted under 35 U.S.C. 154(b) by 633 days.

(21) Appl. No.: 18/056,639

(22) Filed: Nov. 17, 2022

(65) Prior Publication Data

US 2023/0152624 A1     May 18, 2023

Related U.S. Application Data

(60) Provisional application No. 63/264,240, filed on Nov. 17, 2021.

(51) Int. Cl.
*G02F 1/1335* (2006.01)

(52) U.S. Cl.
CPC .... *G02F 1/13355* (2021.01); *G02F 1/133526* (2013.01)

(58) Field of Classification Search
CPC ................................................ G02B 27/0081
USPC ...... 359/483, 485, 487, 489; 353/20, 30, 31, 353/33
See application file for complete search history.

(56) References Cited

U.S. PATENT DOCUMENTS

| | | | | |
|---|---|---|---|---|
| 5,884,991 A | * | 3/1999 | Levis ................. | G02B 27/0994 349/9 |
| 6,375,330 B1 | * | 4/2002 | Mihalakis ............ | H04N 9/3167 348/E5.143 |
| 2003/0210379 A1 | * | 11/2003 | Magarill .............. | G02B 5/3033 353/20 |

(Continued)

OTHER PUBLICATIONS

International Search Report and Written Opinion, PCT App. No. PCT/US2022/080084, May 24, 2023, 10 pages.

*Primary Examiner* — Bumsuk Won
*Assistant Examiner* — Seth D Moser
(74) *Attorney, Agent, or Firm* — Nicholson De Vos Webster & Elliott LLP; Judith Szepesi

(57)     ABSTRACT

A light engine including polarization splitting lens unit comprises an illumination subsystem to create an entrance pupil and a polarization splitting lens unit including an angled polarized beam splitter (PBS) and including an entry face, a double pass face, and an exit face, the polarization splitting lens unit positioned in proximity to the illumination subsystem. The light engine further comprising imaging and illumination optics receiving the light from the polarization splitting lens unit, and a display element modulating the light received from the imaging and illumination optics, and reflecting the light back through the imaging and illumination optics. Wherein the polarization splitting lens unit receives the modulated light from the imaging and illumination optics, and outputs the modulated light through the exit face forming an exit pupil.

21 Claims, 21 Drawing Sheets

(56) References Cited

U.S. PATENT DOCUMENTS

| | | | | |
|---|---|---|---|---|
| 2005/0036119 | A1* | 2/2005 | Ruda ...................... | G02B 17/02 |
| | | | | 353/99 |
| 2007/0030456 | A1* | 2/2007 | Duncan ................ | G02B 27/283 |
| | | | | 353/20 |
| 2007/0291594 | A1 | 12/2007 | Okuyama et al. | |
| 2008/0291399 | A1* | 11/2008 | Fujinawa ............. | G02B 27/286 |
| | | | | 353/20 |
| 2009/0103053 | A1* | 4/2009 | Ichikawa .......... | G03B 21/2073 |
| | | | | 353/33 |
| 2011/0249239 | A1* | 10/2011 | Seo ........................ | G03B 21/28 |
| | | | | 353/20 |
| 2013/0120716 | A1* | 5/2013 | Sun ........................ | G03B 21/16 |
| | | | | 353/61 |
| 2013/0335708 | A1* | 12/2013 | Ouderkirk ........... | G02B 27/283 |
| | | | | 359/487.01 |
| 2014/0177023 | A1* | 6/2014 | Gao ....................... | H04N 23/45 |
| | | | | 359/238 |
| 2021/0072553 | A1 | 3/2021 | Danziger et al. | |
| 2022/0113549 | A1* | 4/2022 | Danziger .......... | G03B 21/2073 |
| 2022/0342216 | A1* | 10/2022 | Danziger ............ | G02B 26/101 |
| 2023/0333374 | A1* | 10/2023 | Collings ............ | G02B 27/0081 |

* cited by examiner

Top View

Entrance Pupil 225

Exit Pupil 255

Illumination Waveguide 220

LEDs 210

Polarization Splitting Lens Unit 230

Entrance Pupil 225

Exit Pupil 255

LCOS 250

Illumination and Imaging Lens Stack 240

Polarization Splitting Lens Unit 230

Entry Face 260

Entry Lens 265

PBS 235

Double-Pass Face 280

Double Pass Lens 285

Exit Face 270

Exit Lens 275

Figure 8A

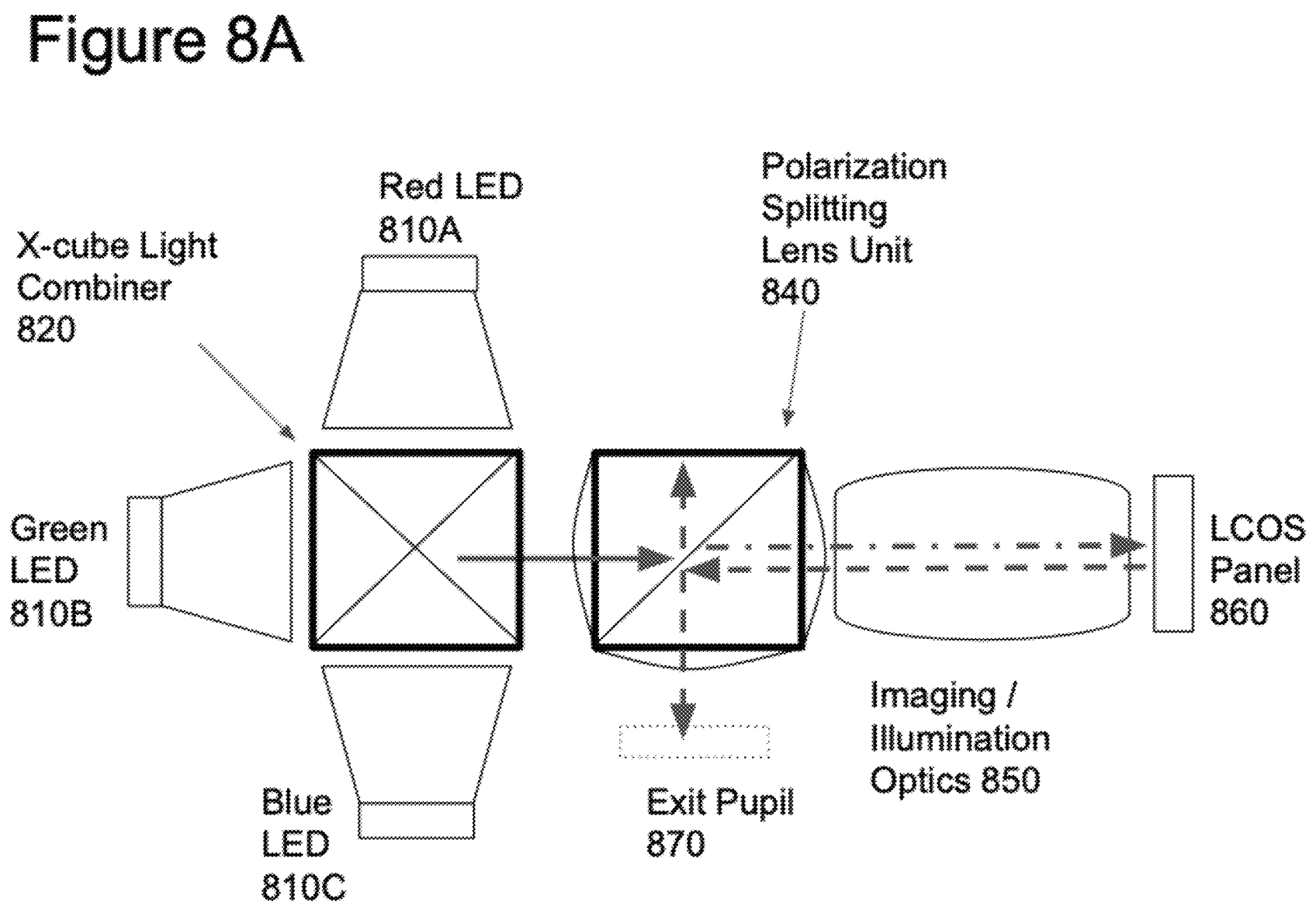

LCOS Panel 860

Polarization Splitting Lens Unit 840

Imaging / Illumination Optics 850

Exit Pupil 870

Red LED 810A

Blue LED 810C

X-cube Light Combiner 820

Green LED 810B

LIGHT ENGINE USING A POLARIZATION SPLITTING LENS UNIT FOR EXIT PUPIL ILLUMINATION

RELATED APPLICATION

The present application claims priority to U.S. Provisional Application 63/264,240 filed on Nov. 17, 2021, and incorporates that application in its entirety.

FIELD

The present invention relates to an architecture for illuminating a display panel utilizing a polarization splitting lens unit.

BACKGROUND

A traditional LCOS (liquid crystal on silicon) system is a reflective display technology that requires an external source of polarized illumination. The light is often provided by separate red, green, and blue LEDs (light emitting diodes). The light from the LEDs, in the prior art configuration, are combined using an X-cube to combine the light from the three different LEDs, providing the different colors. In some embodiments, a lens is used in front of the LED to focus the light. The output of the X-cube passes through an MLA (microlens array) which focuses the light to intermediate optics.

BRIEF DESCRIPTION OF THE FIGURES

The present invention is illustrated by way of example, and not by way of limitation, in the figures of the accompanying drawings and in which like reference numerals refer to similar elements and in which:

FIG. 8A is a diagram of one embodiment of the polarization splitting lens unit using X-cube illumination in a light engine.

DETAILED DESCRIPTION

The present application utilizes a light engine that has overlapping input and output pupils, by using a polarization splitting lens unit to spatially separate the input and output pupils, providing industrial design (ID) flexibility. The polarization splitting lens unit is placed in proximity to the top of the optical stack, which permits this flexibility. The polarization splitting lens unit, in some embodiments, may be rotated in two axes, to shift the output pupil relative to the rest of the light engine. This shifts the field of view, and provides additional flexibility for the positioning of the light engine relative to the downstream optical elements, such as a diffractive waveguide combiner. The light may enter the system through an illumination waveguide, in one embodiment.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
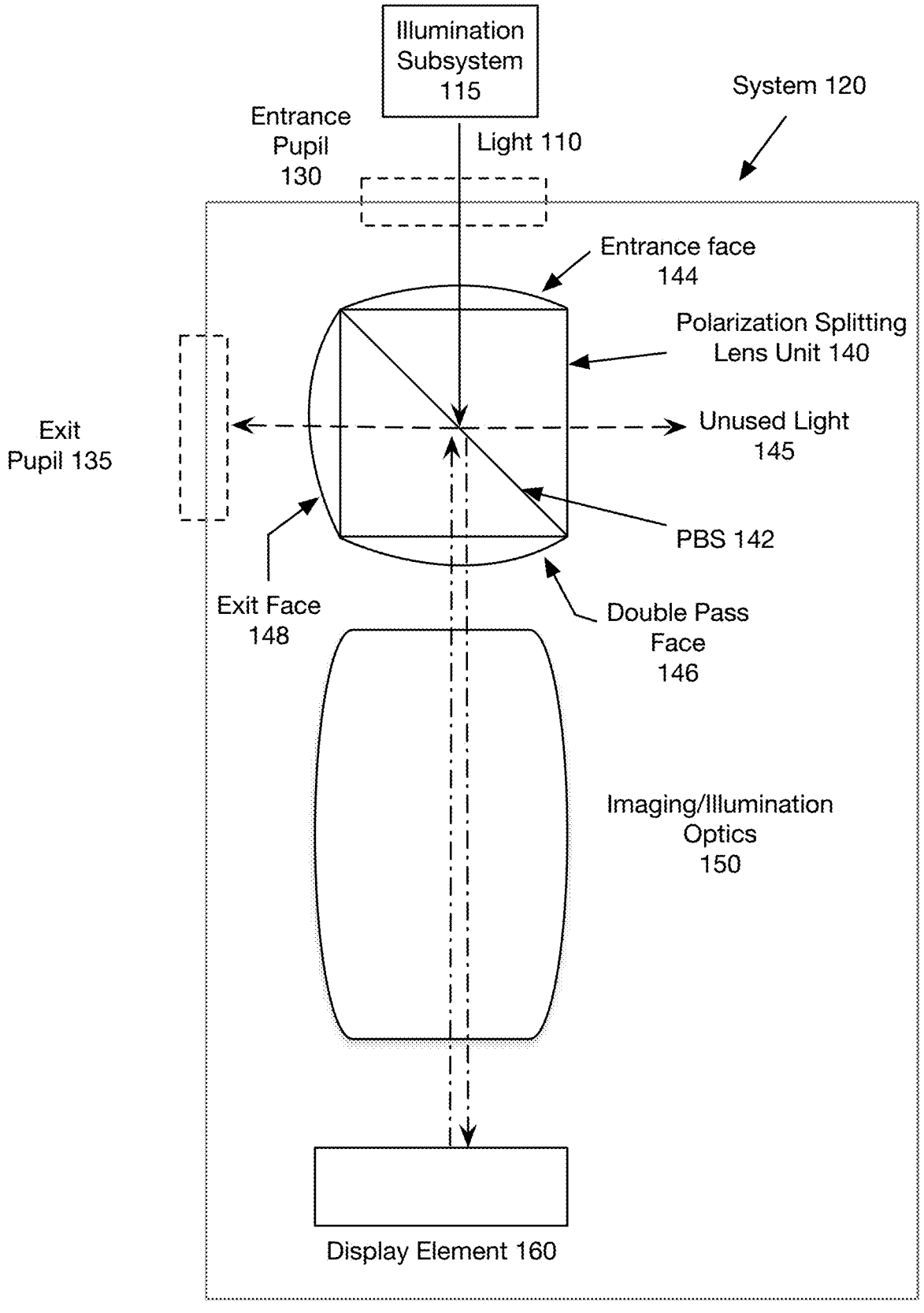
FIG. 1 is an overview diagram of one embodiment of a system in which the polarization splitting lens unit is used.

FIG. 1 is an overview diagram of one embodiment of a system in which the polarization splitting lens unit is used. The light 110 from illumination subsystem 115 enters the system 120. The light 110 is generated by a light source which may be one or more of light emitting diodes (LEDs), organic light emitting diodes (OLEDs), lasers, microLEDs, superluminescent diodes (SLEDs), phosphors, quantum dots, or a light source with a different format. In one embodiment, the light from the LEDs forms the entrance pupil 130. In one embodiment, the illumination subsystem 115 may include light concentrators, an illumination wave-guide, mirrors and lenses or other optics, dichroic plates, a dichroic element, a light combiner, or any other set of one or more elements that can produce an entrance pupil image.

The entrance pupil 130 defines the dimensions of the light as it enters system 120, while the exit pupil 135 defines the dimensions of the light as it exits the system 120. The system 120 includes a polarization splitting lens unit 140. The polarization splitting lens unit 140 in one embodiment is a cuboid with an angled polarizing beam splitter (PBS) 142. The light 110 enters the polarization splitting lens unit 140 through an entrance face 144. Light with a first polarization passes through the PBS toward imaging/illumination optics 150. Any light with the second polarization, when present, is unused light 145, and directed out of the polarizations splitting lens unit 140. In one embodiment, this light is discarded. In another embodiment, this light may be recycled or used in another way. The light exits the polar-ization splitting lens unit 140 through a double pass face 146.

The light that passes through the PBS then passes through imaging/illumination optics 150, and is modulated by dis-play element 160. Display element 160 in one embodiment is a liquid crystal on silicon (LCOS) display. In another embodiment, other types of spatial light modulators may be used. The display element 160 modulates the light, and changes its polarization. The modulated light returned by display element 160 passes through the imaging/illumina-tion optics 150 and enters the polarization splitting lens unit 140 through the double pass face 146. Because the light is now the opposite polarization when it hits the PBS 142, it is reflected toward the exit face 148 of the polarization split-ting lens unit 140, and exits the system 120. Image at the exit pupil 135 may be directed to a user's eye directly or through a waveguide and/or other optics.

The exit pupil 135 is the same size as the entrance pupil 130, in one embodiment. The entrance pupil 130 and the exit pupil 135 are not offset within the same superpupil. A superpupil is the pupil of an optical system, the area in which the lenses are designed and optimized to image all light. Other designs use two offset subpupils within the superpupil to send the light to the display element and receive the light from the display element 160, requiring larger size optics 150. The present system eliminates the need for such sub-pupils. Furthermore, in one embodiment the system reuses the imaging/illumination optics 150 for both the light directed to the display element 160 and the modulated light directed from the display element 160, further reducing size.

The polarization splitting lens unit 140 is positioned close to the light source, rather than in close proximity to the display element 160. In one embodiment, an optical power is applied to one or more of its six faces. Note that while the polarization splitting lens unit is shown as a cube, in one embodiment the shape of the three unused faces is irrelevant, as long as it does not interfere with the light transmission. In one embodiment, the polarization splitting lens unit 140 includes a polarized beam splitter 142 at an angle, two substantially parallel faces 144, 146, and one face 148 substantially perpendicular to the parallel faces, and one or more of the three faces have an optical power applied to them.

In one embodiment, as shown in FIGS. 4B, 5B, 5C, and 6B, the angles of the faces and/or shapes of the lenses may be adjusted when the polarization splitting lens unit is positioned at an angle to the display panel.

Although the exit face lenses on the polarization splitting lens unit 140 are illustrated as being convex surfaces, in one embodiment the lenses may be concave or convex. In one embodiment, the optical power on the entrance face 144 and the double pass face 146 effectively act together as a single lens. The optical power on the exit face 148 in one embodi-ment is matched to the optical power of the entrance face 144. Because the light passes through the double pass face 144 twice, any changes in the image due to the optical power on that face are negated. In one embodiment, there is only optical power on two faces. In one embodiment, there is only optical power on one face.

Figure 2A:
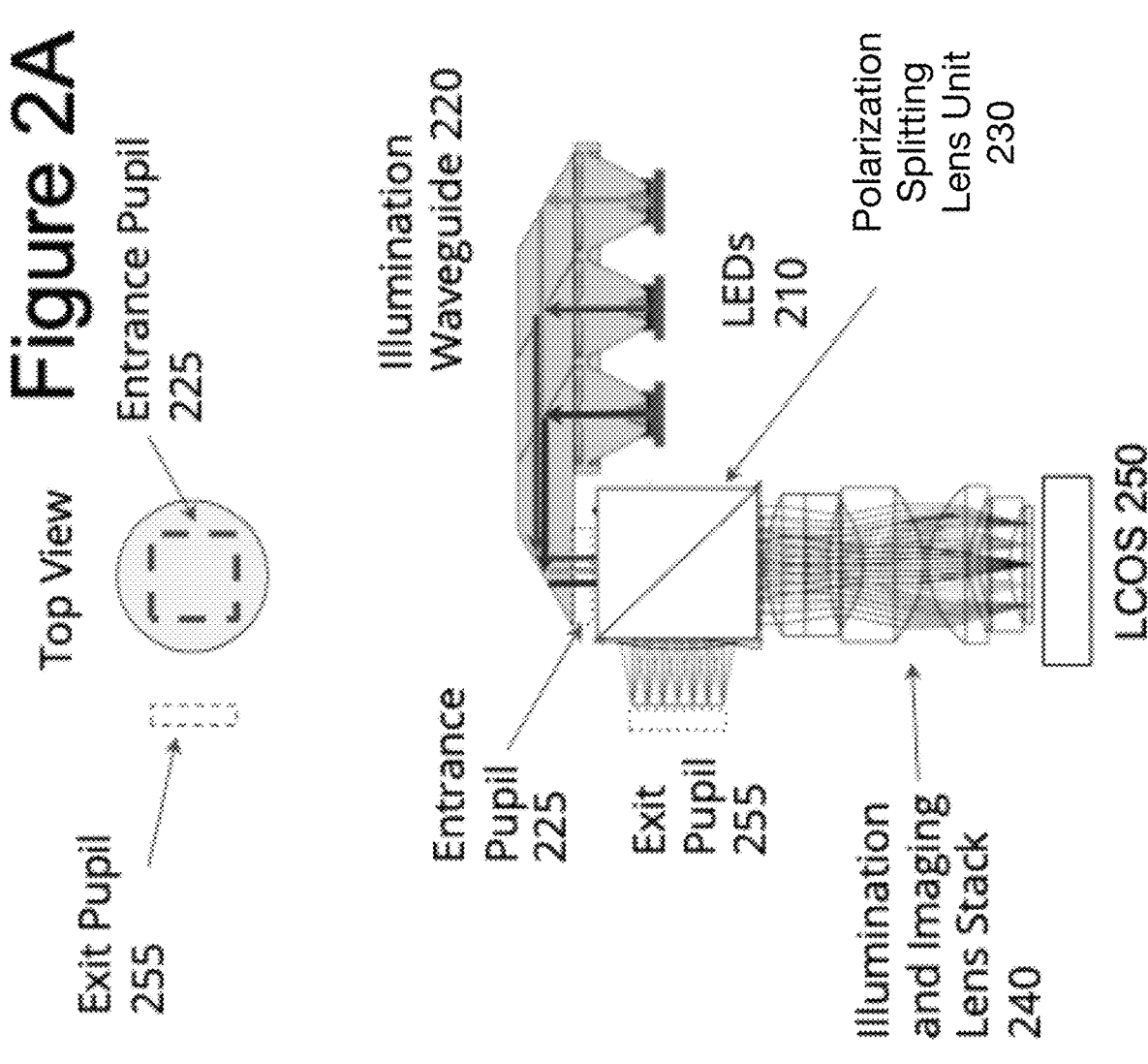
FIG. 2A is a diagram of an overview of one embodiment of the polarization splitting lens unit in a light engine, showing light rays and the input and exit pupil overlap.

FIG. 2A is a diagram of an overview of one embodiment of the polarization splitting lens unit in a light engine, showing light rays and the entrance and exit pupils split from each other by the polarization splitting lens unit. The illus-tration shows the light source as illumination waveguide 220, which guides the light from LEDs 210 to the polariza-tion splitting lens unit 230. The out-coupler of illumination waveguide 220 is positioned in close proximity to the input face of the polarization splitting lens unit 230. The polar-ization splitting lens unit 230 passes the light through to the illumination and imaging stack 240, which focuses the light onto the LCOS 250.

The light is modulated by the LCOS 250, and the polar-ization of the light is reversed, and then the light is redirected back through the illumination and imaging lens stack 240. When the light hits the PBS in the polarization splitting lens unit 230, it is reflected toward the exit pupil. From the exit pupil, the image may be guided through a waveguide or other combiners or elements (not shown) to the user's eyes.

Figure 2B:
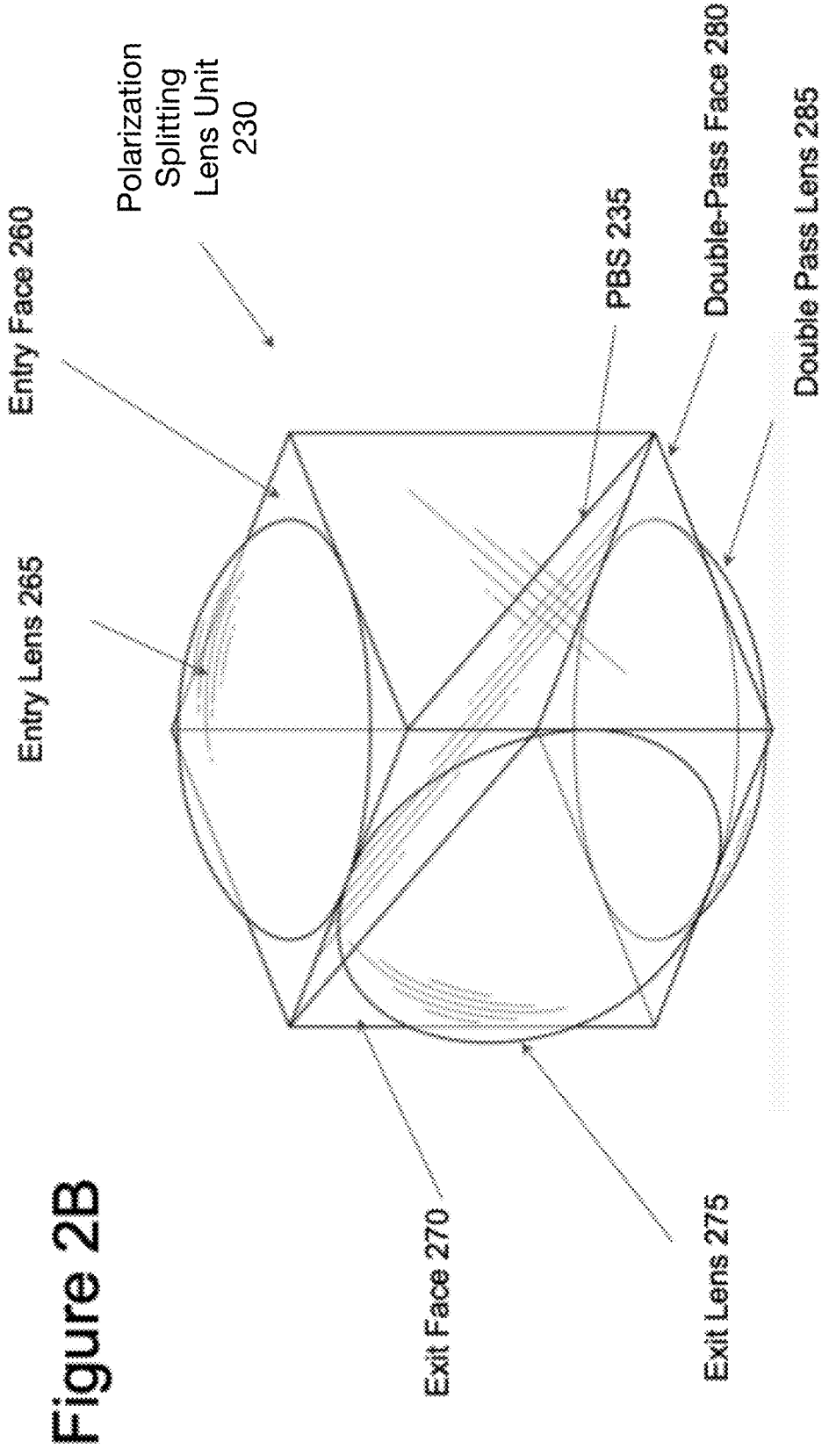
FIG. 2B is a perspective view of one embodiment of the polarization splitting lens unit.

FIG. 2B is a perspective view of one embodiment of the polarization splitting lens unit. In one embodiment, the polarization splitting lens unit 230 includes a polarizing beam splitter (PBS) 235 at an angle, to reflect the light to the exit face of the polarization splitting lens unit 230. In one embodiment, the polarization splitting lens unit 230 is a single element with integrated lenses. In another embodi-ment, the polarization splitting lens unit 230 may include a structure to support the polarizing beam splitter (PBS) 235, and one or more lenses positioned at the locations shown, e.g., potentially one or two lenses parallel to the entrance pupil on either side of the PBS 235, and a lens parallel to the exit pupil, but separate from the structure supporting the PBS 235.

In one embodiment, the polarization splitting lens unit 230 is made of optical glass. In another embodiment, the polarization splitting lens unit is made of optical plastic. In another embodiment, any other optically clear material may be used. In one embodiment, the polarization splitting lens unit 230 is manufactured by gluing together two triangular prisms to form a cuboid, with a grating or other material disposed on the interfacing surfaces of the prisms to form PBS 235.

The polarization splitting lens unit 230 in one embodi-ment has lenses 265, 275, 285 on three of its faces, the entry face 260, the exit face 270, and the double pass face 280. In another embodiment, only one surface may include a lens—in one embodiment the double pass face 280—or on two surfaces—in one embodiment the entry face 260 and exit face 270, may include lenses. The lenses may be shaped to provide an offset to the light exiting the lens. The shaping, on one embodiment, may include the use of a wedge to angle the lens. In one embodiment, the shaping may be a freeform lens.

The lenses can vary from convex to concave. The lenses may be spherical or aspherical, or freeform lenses. The lenses may be plano (flat) lenses, in one embodiment, applying no optical power. In one embodiment, the lenses are made from the same material as the polarization splitting lens unit. In another embodiment, they are made from a different optical material. In one embodiment, the lenses are manufactured on the polarization splitting lens unit 230. In one embodiment, the lenses are glued onto the polarization splitting lens unit 230. In another embodiment, the lens shapes are manufactured as part of the two prisms which form the polarization splitting lens unit 230.

Figure 3:
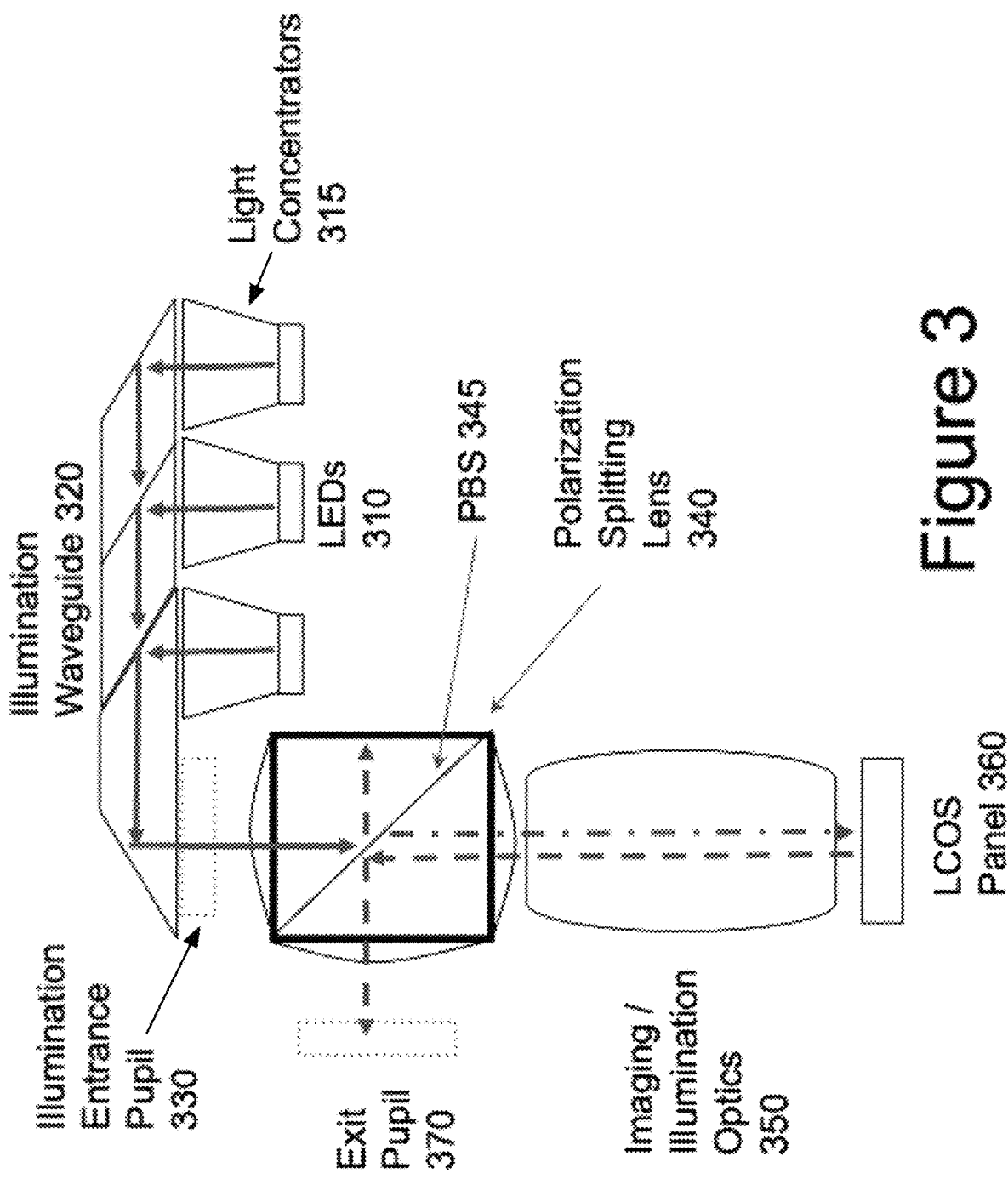
FIG. 3 is a diagram of an overview of one embodiment of the polarization splitting lens unit in a light engine.

FIG. 3 is a diagram of an overview of one embodiment of the polarization splitting lens unit in a light engine. The light from LEDs 310 passes through light concentrators 315, into an illumination waveguide 320. In one embodiment, each color LED 310 has a separate in-coupler into waveguide 320. Although the in-couplers are illustrated as being horizontally displaced, in one embodiment the LEDs 310 and associated in-couplers are displaced along any of the axes, including the Z-axis. In one embodiment, the LEDs are arranged in a circular pattern.

The out-coupler of the illumination waveguide 320 defines the illumination entrance pupil 330. The entrance pupil 330 defines the size and orientation of the light entering the system. The light from the out-coupler enters the entry surface of polarization splitting lens unit 340. The light passes through the PBS 345. In one embodiment, light of a second polarization is reflected out of the polarization splitting lens unit 340. In one embodiment, that light is discarded.

The light exiting the polarization splitting lens unit 340 passes through imaging/illumination optics 350, to LCOS panel 360. The light modulated by LCOS panel 360 is reflected back through imaging/illumination optics 350, and enters the polarization splitting lens unit 340. The light is then reflected by the PBS 345, out of the polarization splitting lens unit 340. The light exiting the polarization splitting lens unit 340 forms the exit pupil 370. The light exiting polarization splitting lens unit 340 may be coupled into another waveguide (not shown).

Figure 4A:
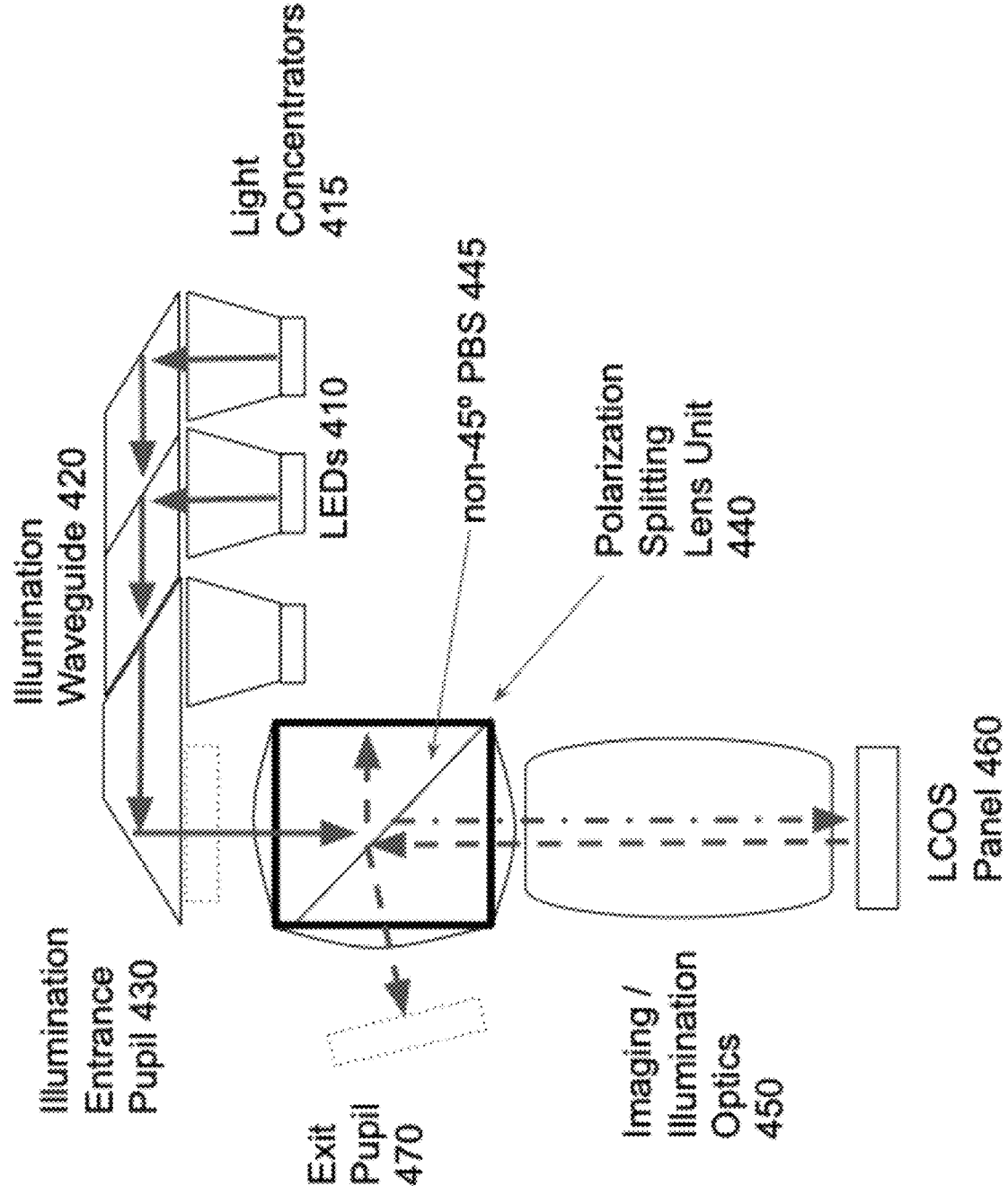
FIG. 4A is a diagram of an embodiment of the polarization splitting lens unit with a differently angled polarized beam splitter (PBS) in a light engine.

FIG. 4A is a diagram of an embodiment of the polarization splitting lens unit with a differently angled polarized beam splitter (PBS). In this configuration, the angle of the PBS 445 is not 45 degrees, but rather a different angle. Displacing the PBS 445 changes the output angle of the exit pupil 470 from the normal angle. This is useful to change the optical axis up or down, which provides industrial design flexibility. It also offsets the field of view. In one embodiment, the PBS 445 angle may vary from 20° to 70° (45°±25°).

In addition to the increased industrial design flexibility, displacing the exit pupil 470 also reduces ghosting from a reflected image from a combining waveguide into which the exit pupil 470 is directed (not shown). As the light from the exit pupil 470 enters the in-coupling grating of the combining waveguide, a portion of it is diffracted back as if the light had hit a mirror. Angling the exit pupil as shown in FIG. 4A causes that reflected image from this diffractive order to either miss the PBS 445 or to enter the PBS 445 at an off-axis angle; this reduces the amount of light that makes it back through the system to the LCOS panel 460. Without the angle, in some embodiments this diffracted light enters the system on-axis, hits the LCOS panel which reflects it back to the exit pupil, which can cause a noticeable ghost in the final image. The angled exit pupil reduces or eliminates the ghost image from the bounce-back (diffractive order).

Figure 4B:
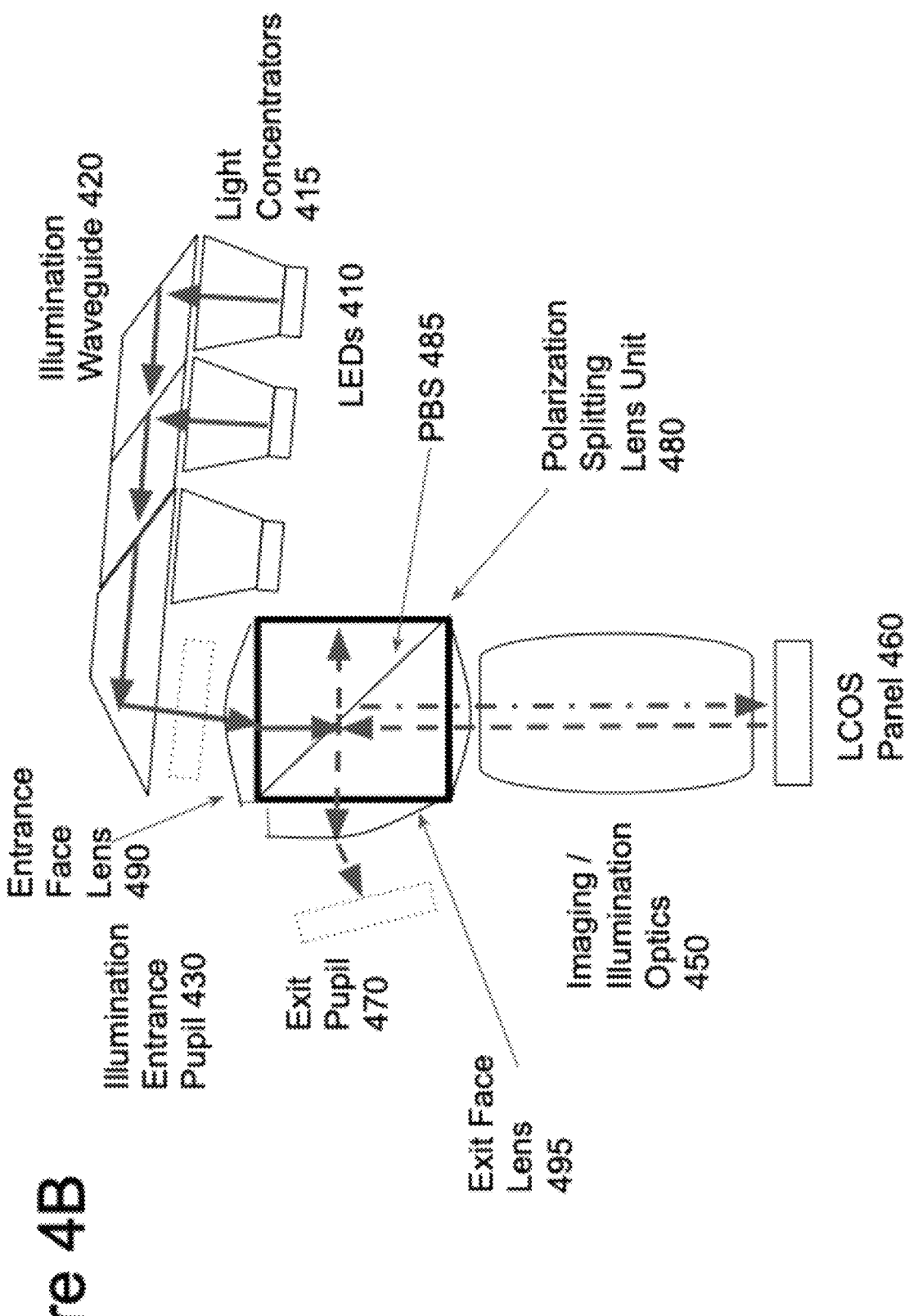
FIG. 4B is a diagram of one embodiment of the polarization splitting lens unit with offset lenses to create an offset exit pupil in a light engine.

FIG. 4B is a diagram of one embodiment of the polarization splitting lens unit with offset lenses to create an offset exit pupil. In this configuration, the PBS 485 in the polarization splitting lens unit 480 is at a standard 45 degree angle, and the off-set exit pupil 470 is produced by a shaped exit face lens 495. In one embodiment, the optical power and shape of the entrance face lens 490 is matched to the optical power and shape exit face lens 495, to avoid distortion, having a corresponding offset angle. In one embodiment, because the entrance face lens 490 is angled with respect to the polarization splitting lens unit 480, the illumination waveguide 420, or its out-coupler, is also positioned at an angle, so the light enters the entrance face lens 490 of polarization splitting lens unit 480 at an angle. The entrance face lens 490 alters the angle of the light, so the light impacting the PBS 485 is correctly oriented to be directed to the LCOS panel 460, and modulated. This configuration also provides an offset exit pupil 470, with its attendant benefits, while using polarization splitting lens unit 480 with a PBS 485 at a 45 degree angle.

Figure 5A:
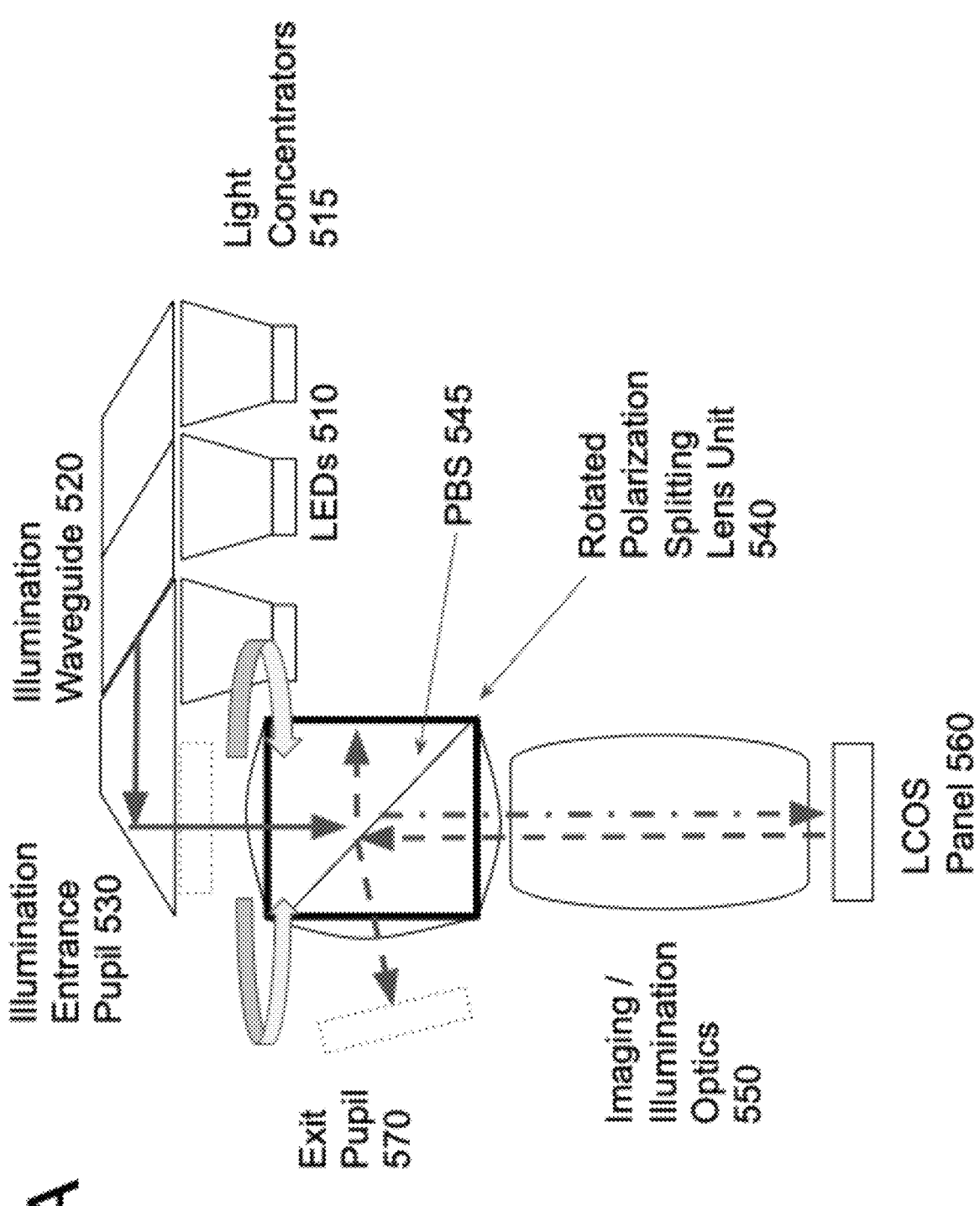
FIG. 5A is a diagram of an embodiment of the polarization splitting lens unit with a polarization splitting lens unit rotated around the Y-axis in a light engine.

FIG. 5A is a diagram of an embodiment of the polarization splitting lens unit with a polarization splitting lens unit rotated around the Y-axis. In this configuration, the polarization splitting lens unit 540 may be rotated to shift the angle of the exit pupil 570. By rotating the polarization splitting lens unit 540, the angle of impact of light returning from LCOS 560 changes, which displaces the exit pupil 570. In the configuration where the angle of the PBS 545 is different from 45° and the polarization splitting lens unit 540 is rotated around the Y-axis, the output optical axis, and thus the angle of the exit pupil 570 is rotated in two axes and the final rotated angle isn't contained in a single axis plane. This enables the positioning of the exit pupil 570 more flexibly for the configuration of a wearable system. In one embodiment, the rotation of the polarization splitting lens unit 540 may be between 0.1 degree and 25 degrees in either direction.

Figure 5B:
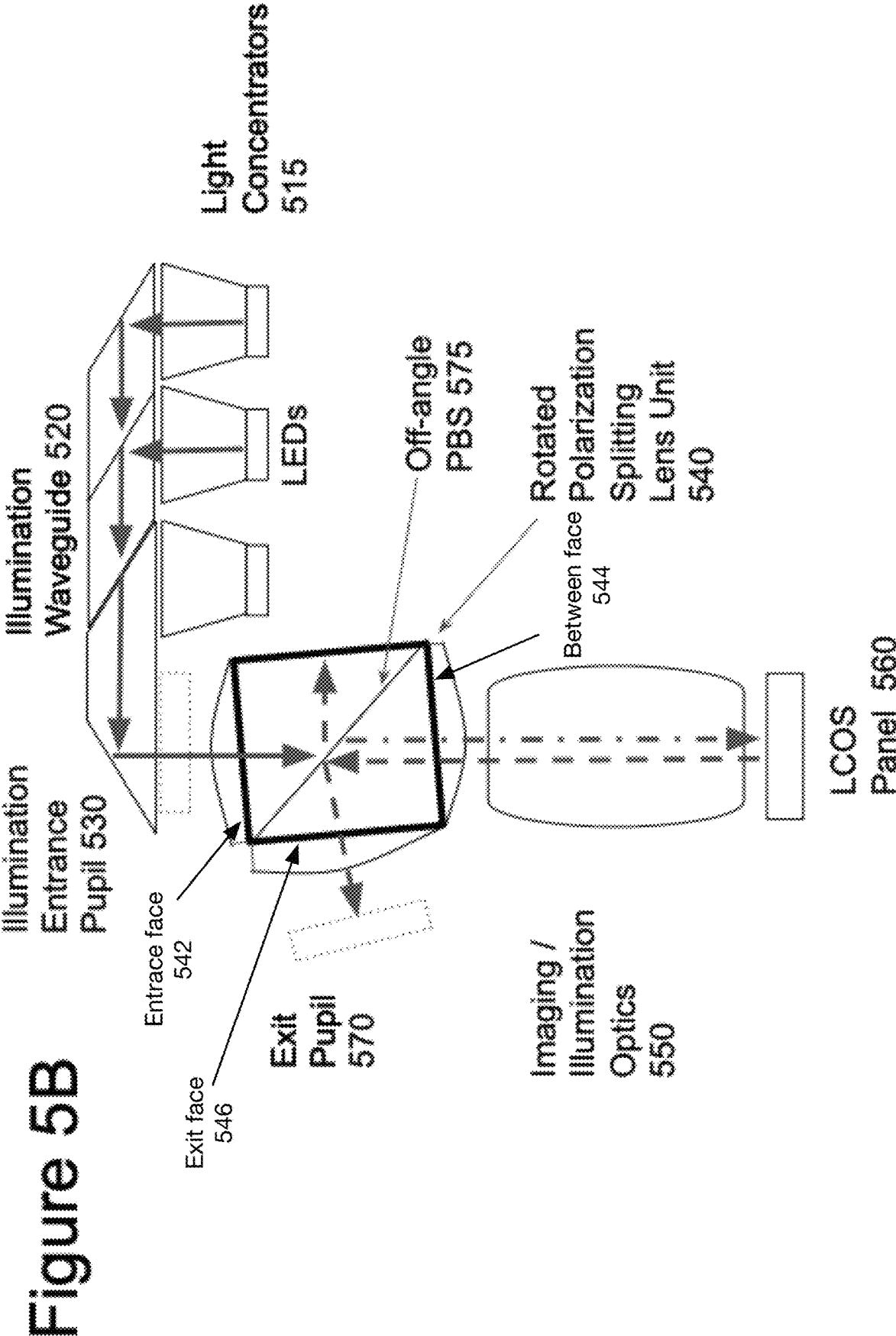
FIG. 5B is a diagram of an embodiment of the polarization splitting lens unit with a rotated polarization splitting lens unit rotated around the Z-axis in a light engine.

FIG. 5B is a diagram of an embodiment of the polarization splitting lens unit with a rotated polarization splitting lens unit tilted and rotated around the Z-axis. In this configuration, the polarization splitting lens unit 540 is tilted, and the PBS 575 is off-angle, that is not at a 45 degree angle in one or both directions. This produces a more significant displacement of the exit pupil 570. As noted above, the displacement of the exit pupil 570 provides more positioning flexibility and may reduce ghost images. In one embodiment, the shapes and/or lenses on the entrance face 542, between face 544, and the exit face 546 of the polarization splitting lens unit 540 are adjusted so that the optical axis is normal to the surface of the polarization splitting lens unit 540. In one embodiment, this may be done by inserting an angled element between the face of the polarization splitting lens unit cube and the lens, in one or more of the faces 542, 544, 546. In one embodiment, this may be done by using a free form lens shape to provide the angle change needed. In another embodiment, as shown in FIG. 5C, the underlying polarization splitting lens unit shape is changed, to provide this alignment.

Figure 5C:
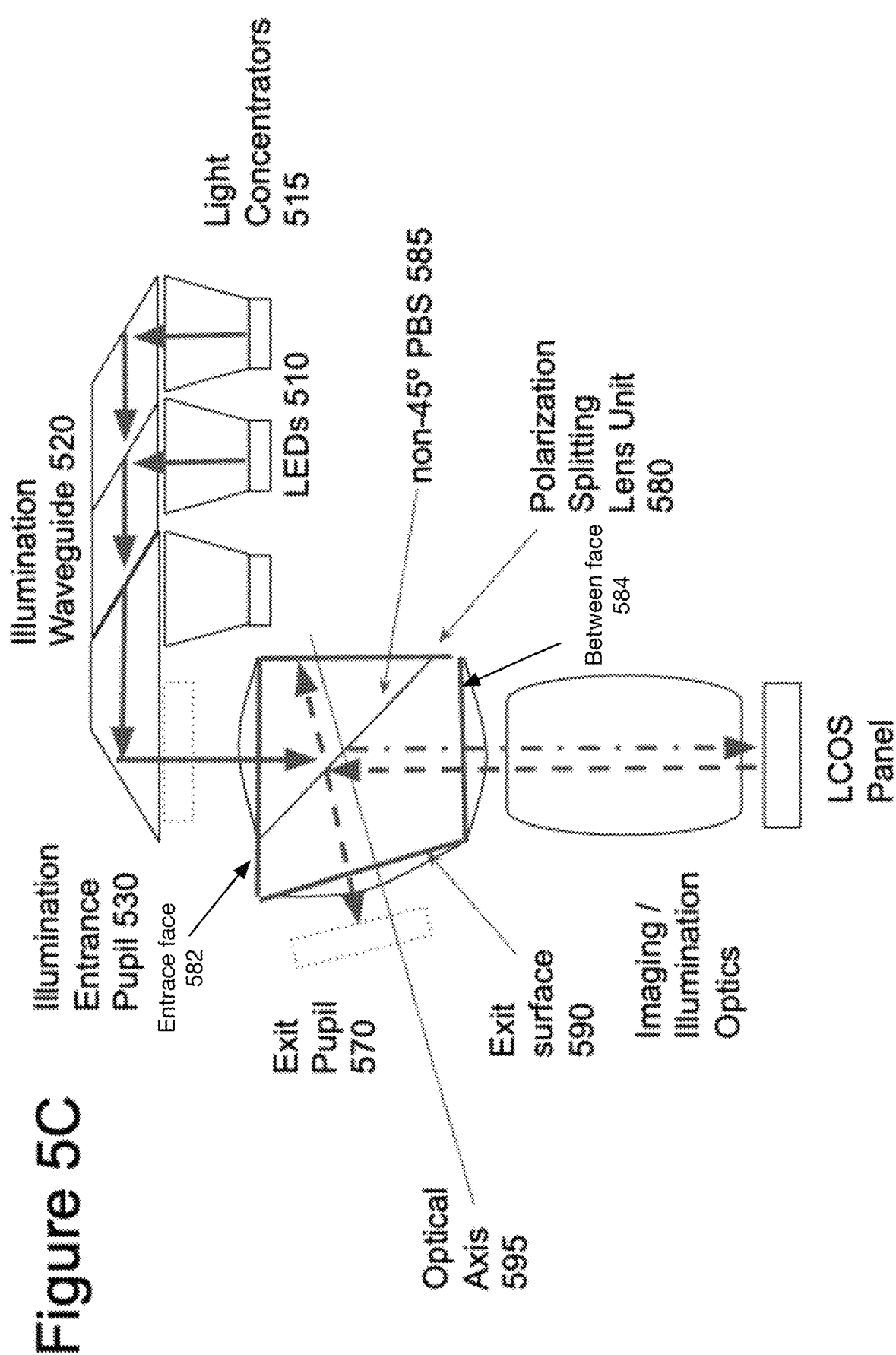
FIG. 5C is a diagram of an embodiment of the polarization splitting lens unit with a rotated polarization splitting lens unit rotated around the Z-axis in a light engine.

FIG. 5C is a diagram of an embodiment of the polarization splitting lens unit with a polarization splitting lens unit that produces an off-angled exit pupil. Rather than tilting the entire polarization splitting lens unit 580, in this configuration the exit surface 590 where the light exits the polarization splitting lens unit 580 is angled. This also creates an off-angle exit pupil 570, with the exit face 590 of the polarization splitting lens unit 580 aligned to an output optical axis, so that the optical axis 595 is normal to the exit surface 590 and aligned with the optical axis 595 of the lens on that surface 590. The shape of the polarization splitting lens unit 580 in this configuration is a cuboid with the exit face displaced to create an effective tilt. The entrance face 582 and between face 584 of the polarization splitting lens unit 580 are parallel.

Figure 6A:
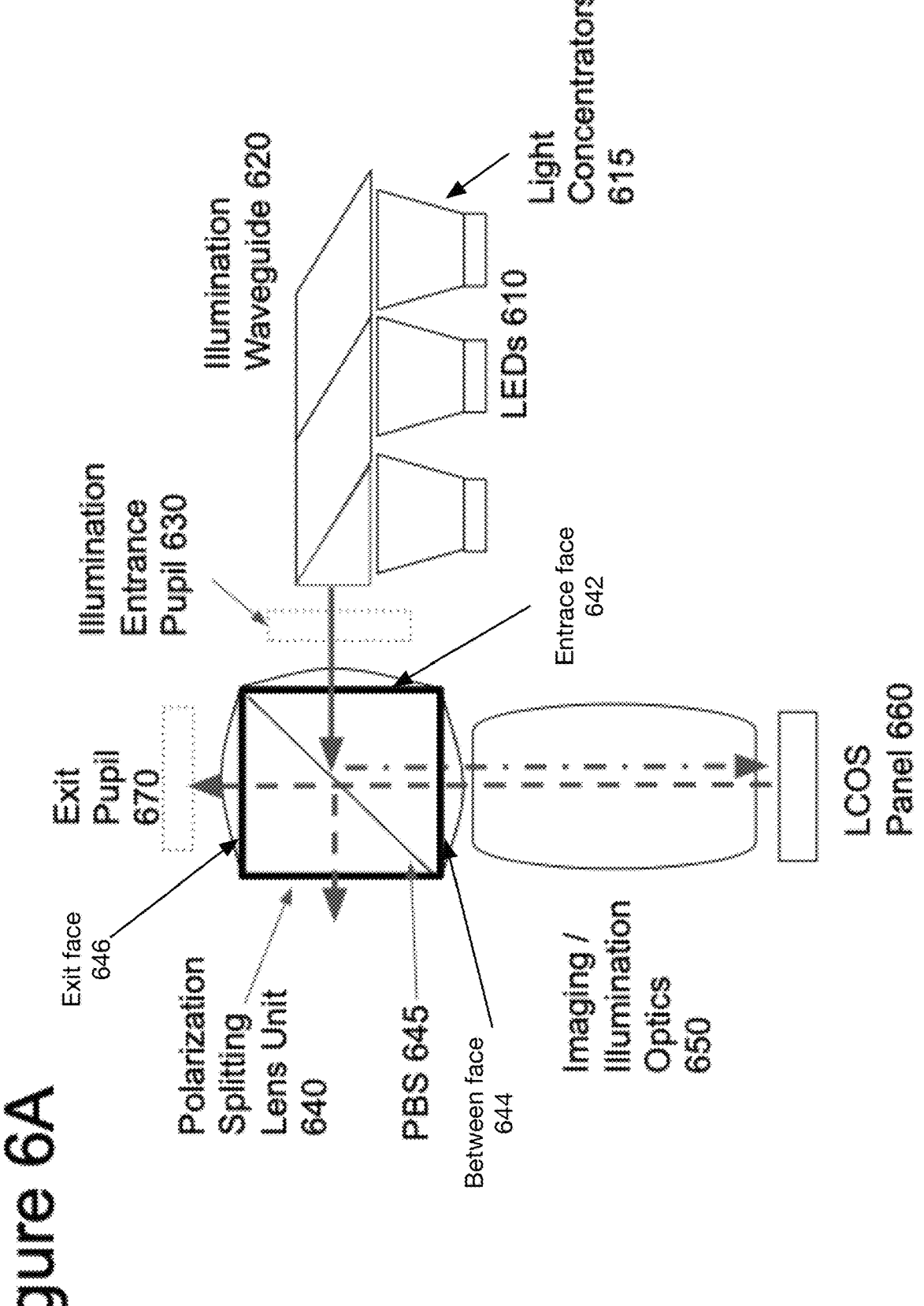
FIG. 6A is a diagram of one embodiment of the polarization splitting lens unit with the exit pupil in line with the projector element in a light engine.

FIG. 6A is a diagram of one embodiment of the polarization splitting lens unit with the exit pupil in line with the projector element. In this configuration, the light from LEDs 610 is input through light concentrators 615 into illumination waveguide 620. The light exiting the illumination waveguide 620 forms illumination entrance pupil 630, and enters the polarization splitting lens unit 640 through its entry face 642. In this configuration, the light with a first polarization is reflected by PBS 645 toward the LCOS panel 660. The portion of light that is polarized in a second direction, if any, passes through the polarization splitting lens unit 640. In one embodiment, this light is discarded. In another embodiment, the light may be recycled.

The reflected light passes through imaging/illumination optics 650 to LCOS panel 660. The light is modulated by the LCOS panel 660, and returned through imaging/illumination optics 650 to the between face 644 of the polarization splitting lens unit 640. This light re-enters the polarization splitting lens unit 640 through the between face 644, and passes through the PBS 645 to form exit pupil 670. This aligns the LCOS panel 660 with the exit pupil, rather than offsetting it by 90 degrees. This configuration may be useful in some designs, based on the available positions for the optics 650 and LCOS panel 660.

Figure 6B:
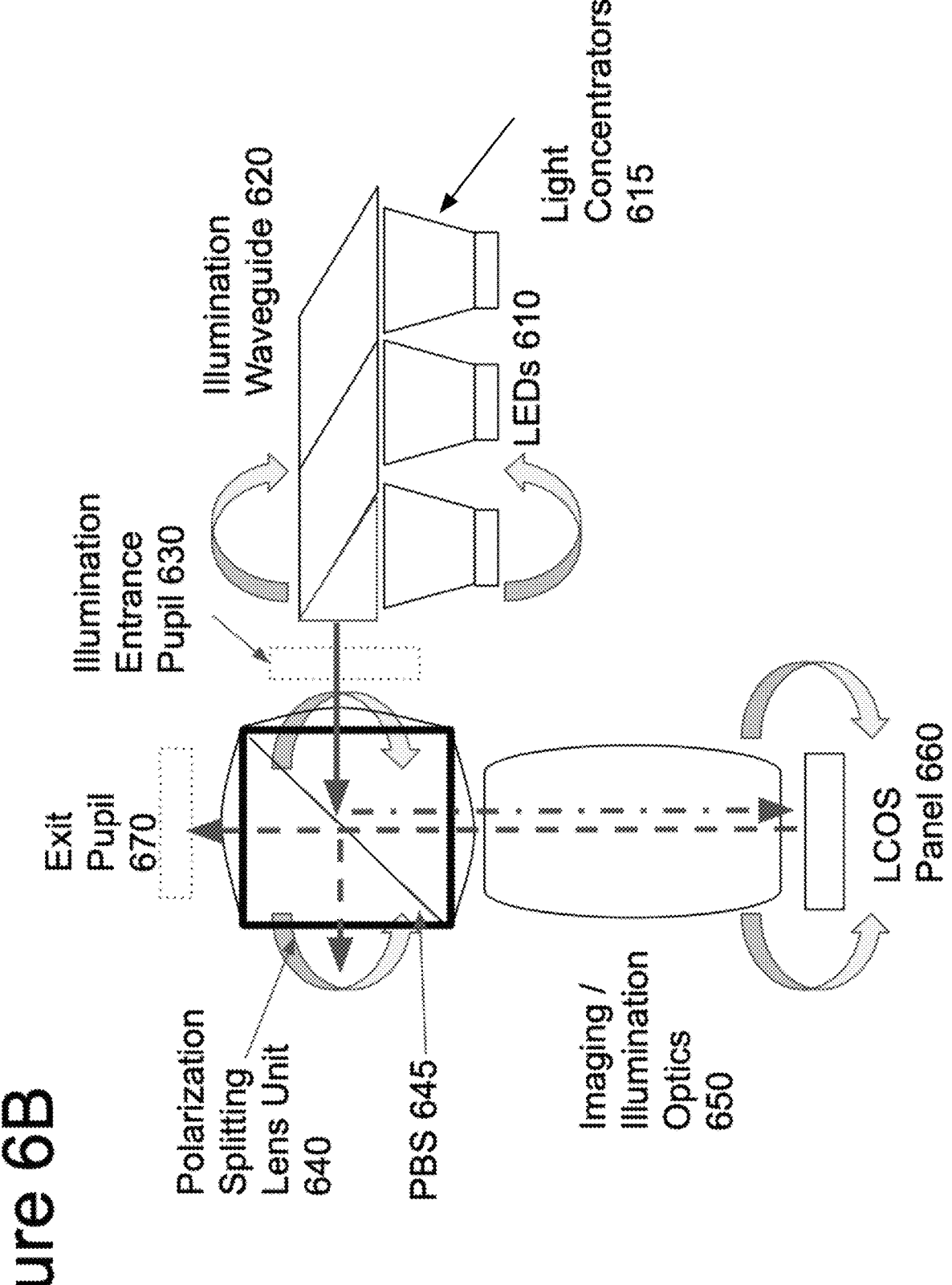
FIG. 6B is a diagram of one embodiment of the polarization splitting lens unit with a rotated polarization splitting lens unit in a light engine.

FIG. 6B is a diagram of one embodiment of the polarization splitting lens unit with a rotated polarization splitting lens unit. In this embodiment, the polarization splitting lens unit 640 is rotated about an axis normal to the LCOS panel 660. Because this rotation shifts the angle of the PBS 645 to the incoming light, illumination sub-system is rotated to correctly position the illumination entrance pupil 630 for the rotated polarization splitting lens unit 640. The illumination subsystem includes the illumination waveguide 620, LEDs 610, and light concentrators 615 which work together to output the light in an illumination entrance pupil 630. The rotation of the illumination subsystem ensures that the light illuminates the active area of the LCOS panel 660. Alternatively, or additionally, the LCOS panel 660 can be rotated to ensure that the light reflected by the polarization splitting lens unit 640 hits the active area of the LCOS panel 660. In one embodiment, when the LCOS 660 is rotated, the system may include a polarization management method, such as additional retarder films, to ensure the incoming polarization state is aligned to the preferred state of the display panel 660 to ensure contrast.

Figure 6C:
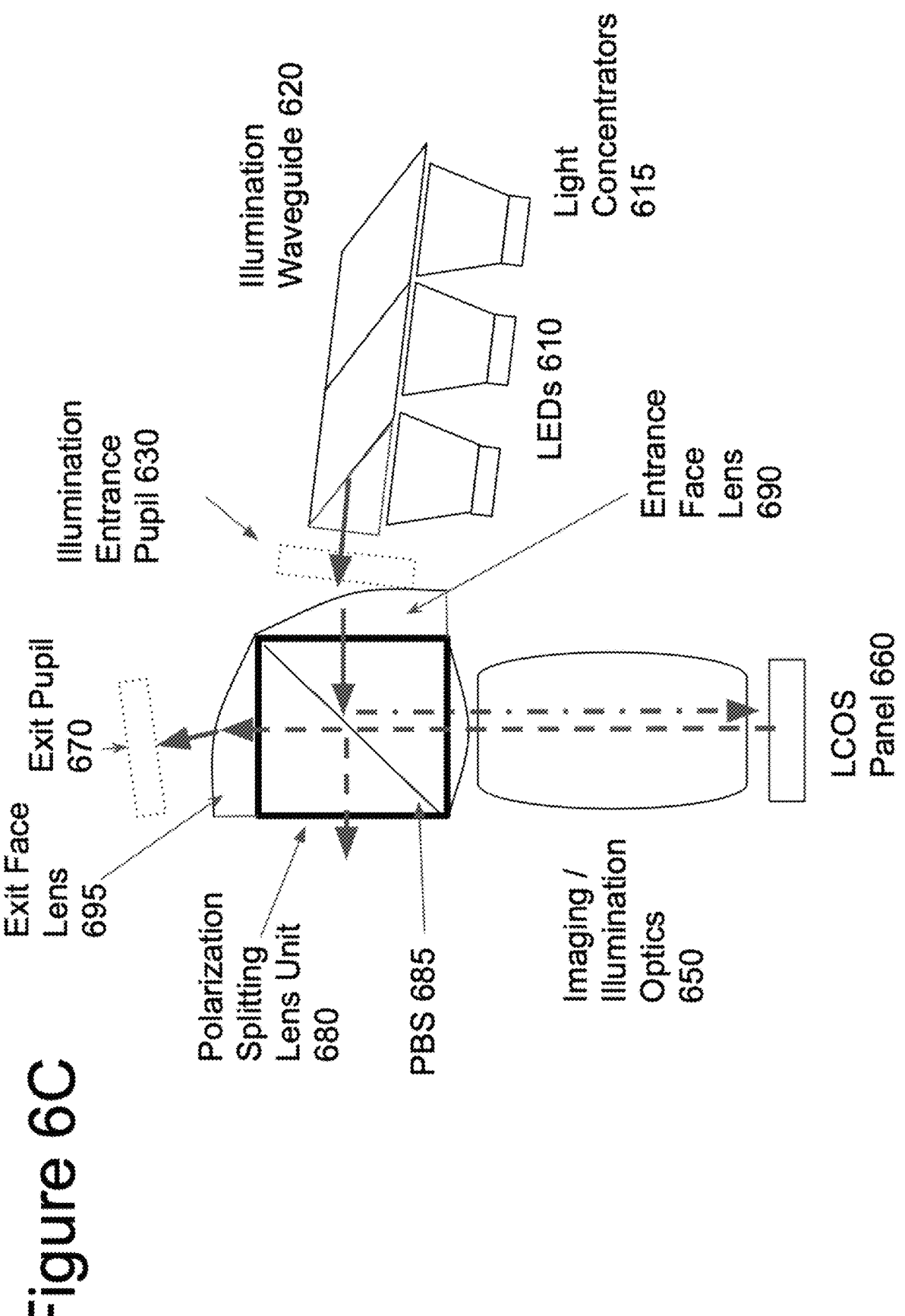
FIG. 6C is a diagram of one embodiment of the polarization splitting lens unit with offset lenses to create an offset exit pupil in a light engine.

FIG. 6C is a diagram of one embodiment of the polarization splitting lens unit with offset lenses to create an offset exit pupil. In this configuration, the shape of the entrance face lens 690 and the shape of the exit face lens 695 on the polarization splitting lens unit 680 are shaped to offset the exit pupil. By using a shaped exit face lens 695, the exit pupil 670 is offset. As noted above, this has advantages in reducing ghosting, and providing positioning flexibility for the system. To match the offset of the exit face lens 695, the entrance face lens 690 is offset as well. In one embodiment, the offsets are matching. Because the entrance face lens 690 is offset, in one embodiment, the illumination waveguide 620 and/or the out-coupler of the illumination waveguide is angled or positioned, so is the light exiting the illumination waveguide 620 is at an angle so the offset entrance face lens 690 corrects for the angling of the light. Thus, the light impacts the PBS 685 at a 45 degree angle, despite the offset of the entrance face lens 690.

Figure 7A:
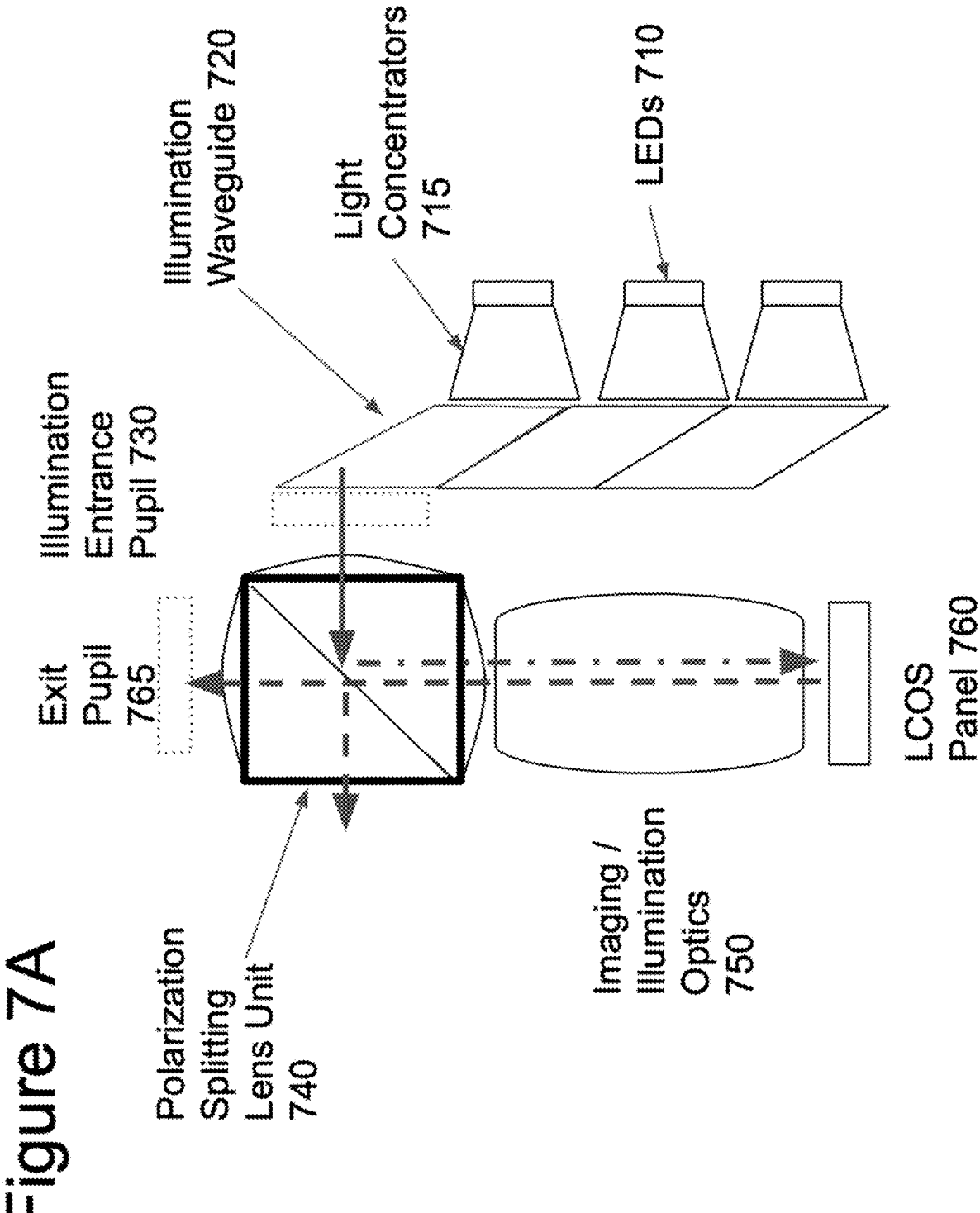
FIG. 7A is a diagram of one embodiment of the polarization splitting lens unit with the exit pupil in line with the projector element, using a U-fold illumination element in a light engine.

FIG. 7A is a diagram of one embodiment of the polarization splitting lens unit with the exit pupil in line with the projector element, using a U-fold illumination configuration. The U-fold illumination configuration positions the imaging/illumination optics 750 and the illumination waveguide 720 in parallel. This reduces the area required for the system. This configuration also has the exit pupil 765 in-line with the LCOS panel 760.

Figure 7B:
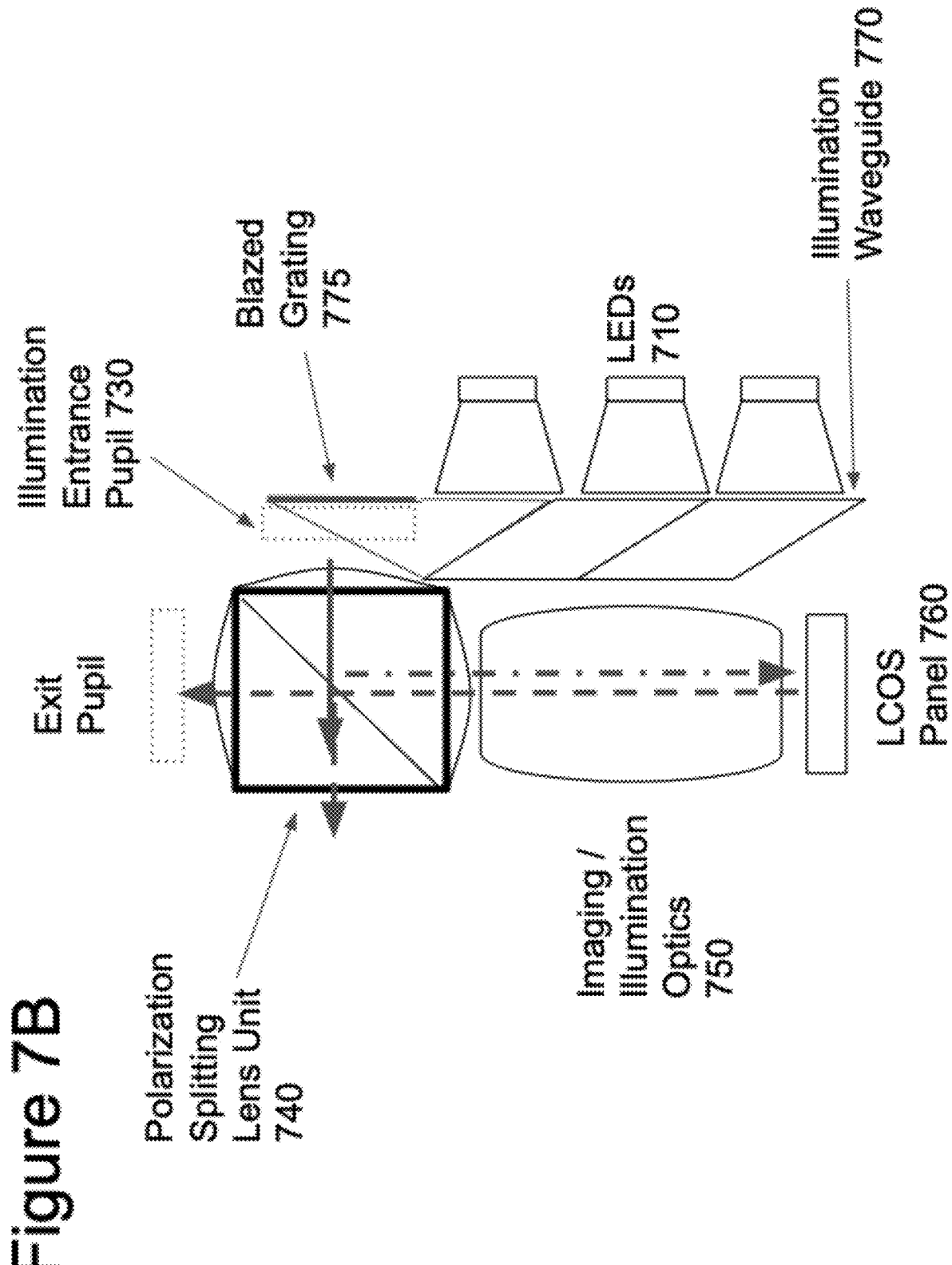
FIG. 7B is a diagram of one embodiment of the polarization splitting lens unit with the exit pupil in line with the projector element, using a U-fold illumination element with a blazed grating in a light engine.

FIG. 7B is a diagram of one embodiment of the polarization splitting lens unit with the exit pupil in line with the projector element, using a U-fold illumination configuration with a blazed grating. In this configuration the illumination waveguide 770 is in parallel with the imaging/illumination optics 750. The out-coupler 775 of illumination waveguide 770 is a blazed grating 775. A blazed grating 775 is a diffraction grating, in one embodiment formed using a sawtooth pattern with metallization. This provides a more compact design for the illumination waveguide 770, because the illumination waveguide 770 can be positioned in closer proximity to the polarization splitting lens unit 740. In one embodiment, the blazed grating 775 may be replaced by a holographic, diffractive, or other optical surface to out-couple the light from illumination waveguide 720.

FIG. 8A is a diagram of one embodiment of the polarization splitting lens unit using X-cube illumination. In this configuration the light sources, LEDs 810A-810C are combined by X-cube light combiner 820, before entering the polarization splitting lens unit 840. The polarization splitting lens unit 840 passes the light of a first polarization through to imaging/illumination optics 850, and discards light of the opposite polarization. The LCOS panel 860 modulates the light and flips its polarization before passing it back through imaging/illumination optics 850. On the second pass, the polarization splitting lens unit 840 reflects the light from the LCOS 860, to exit pupil 870.

Figure 8B:
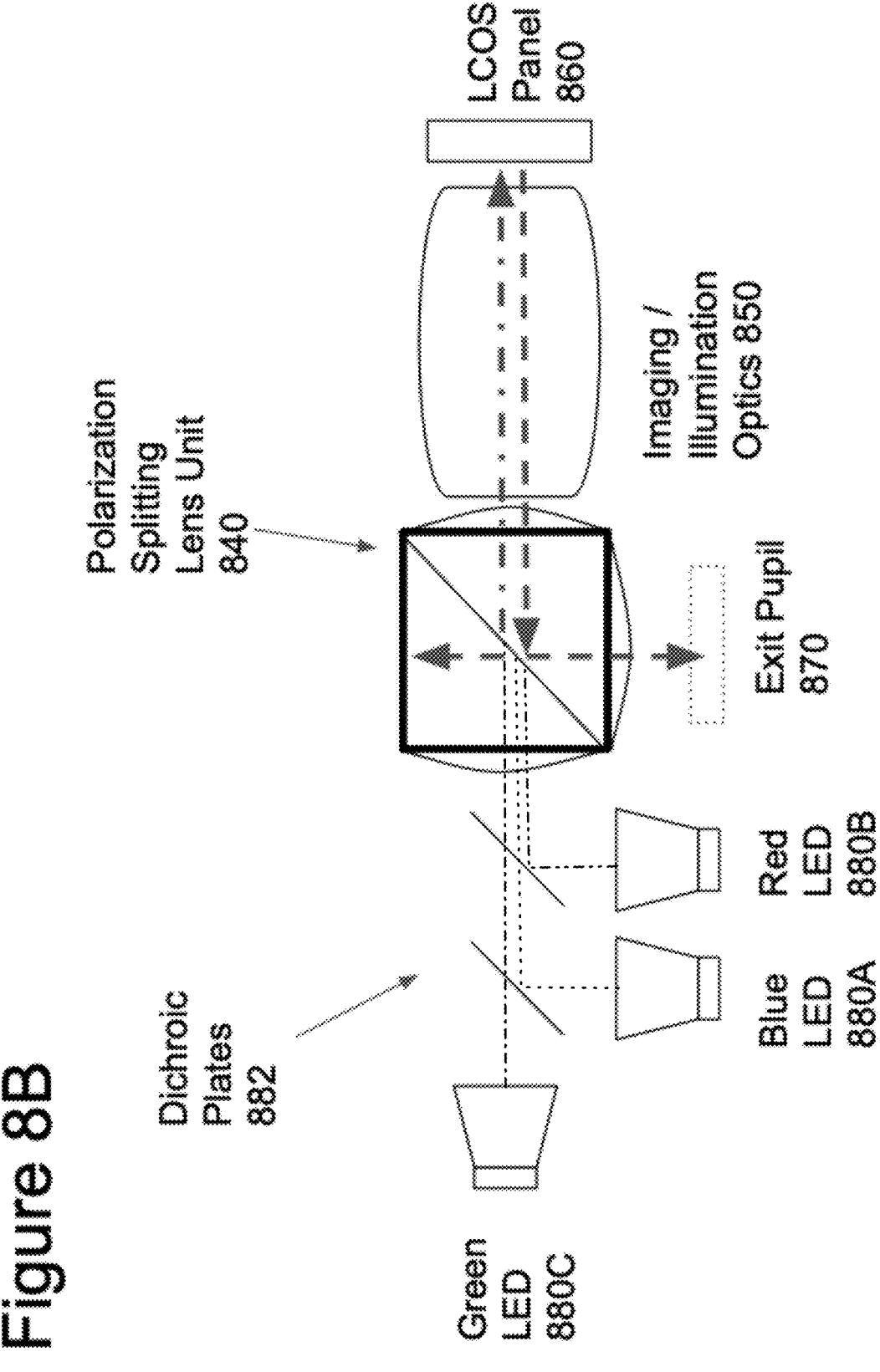
FIG. 8B is a diagram of one embodiment of the polarization splitting lens unit using dichroic plates in a light engine.

FIG. 8B is a diagram of one embodiment of the polarization splitting lens unit using dichroic plates in a light engine. In this embodiment, the illumination subsystem includes dichroic plates 882, to direct the light to the polarization splitting lens unit 840. One of the dichroic plates 882 in one embodiment, reflects red light from red light source 880B, and passes through light from green light source 880C. The other dichroic plate 882 reflects blue light from blue light source 880A, and passes through light from green light source 880C. The light lines are displaced to show the reflection v. pass-through aspect, the lights are not displayed in a real display system. In one embodiment, each light source 880A-880C includes an LED, a reflective light concentrator, and one or more lenses.

Figure 8C:
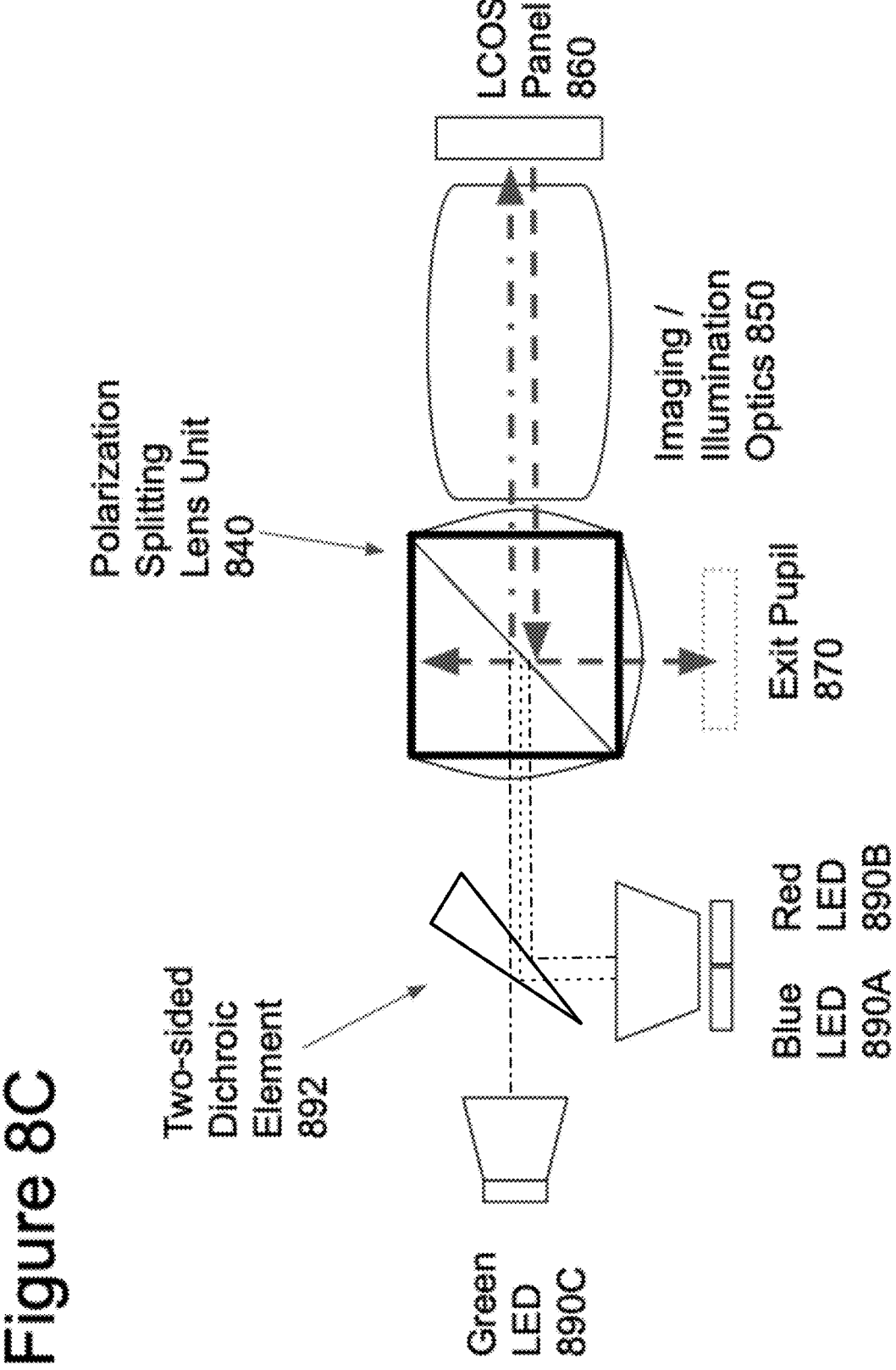
FIG. 8C is a diagram of one embodiment of the polarization splitting lens unit using a dichroic element in a light engine.

FIG. 8C is a diagram of one embodiment of the polarization splitting lens unit using a dichroic element in a light engine. In this embodiment, the illumination subsystem includes a dichroic element 892, to direct the light to the polarization splitting lens unit 840. The dichroic element 892 in one embodiment has different coatings on the two sides of a dichroic shape, with both sides designed to pass through some colors of light, while reflecting other colors of light. In one embodiment, the nearer side is designed to pass through light from a blue light source 890A, with the interior surface of the further side reflecting the blue light toward the polarization splitting lens unit 840. The nearer side is also designed to reflect the light from the red light source 890B. Both sides pass through light from the light source 890C. This enables the system to use a small dichroic element 892 to direct light from the light sources to the polarization splitting lens unit 840. In one embodiment, each light source 890A-890C includes an LED, a reflective light concentrator, and one or more lenses.

Figure 9:
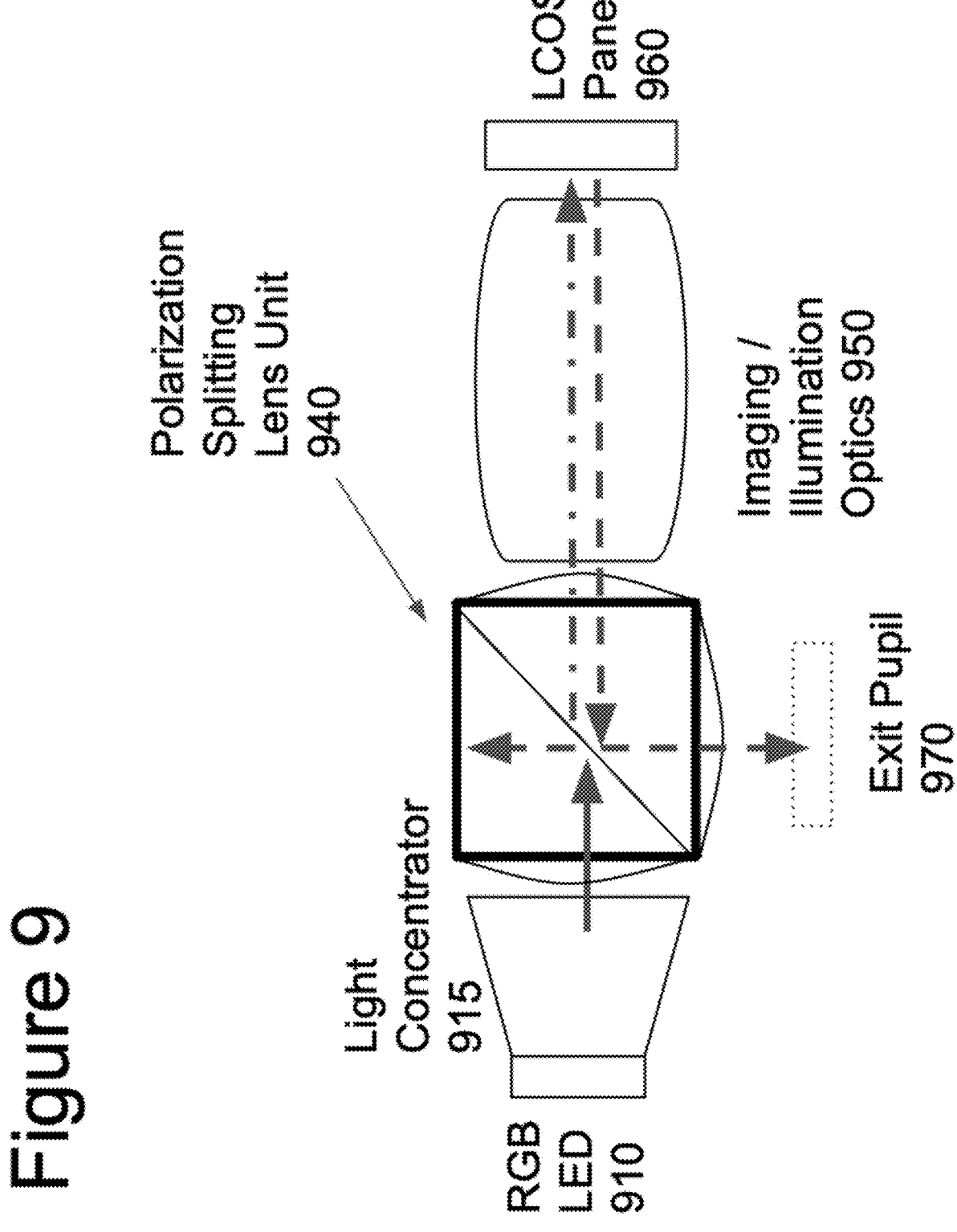
FIG. 9 is a diagram of one embodiment of the polarization splitting lens unit using RGB illumination in a light engine.

FIG. 9 is a diagram of one embodiment of the polarization splitting lens unit using RGB illumination. The RGB LED(s) 910 are concentrated by light concentrator 915, and are in-coupled into the polarization splitting lens unit 940's entrance surface. The light with the first polarization passes through the polarization splitting lens unit 940, and passes through imaging/illumination optics 950 to LCOS panel 960. The light with the second polarization is reflected, and discarded. After the LCOS panel 960 modulates the light, it passes back through the imaging/illumination optics 950, and into the polarization splitting lens unit 940. The light, now having the opposite polarization is reflected by the PBS in the polarization splitting lens unit 940 to exit pupil 970.

Figure 10:
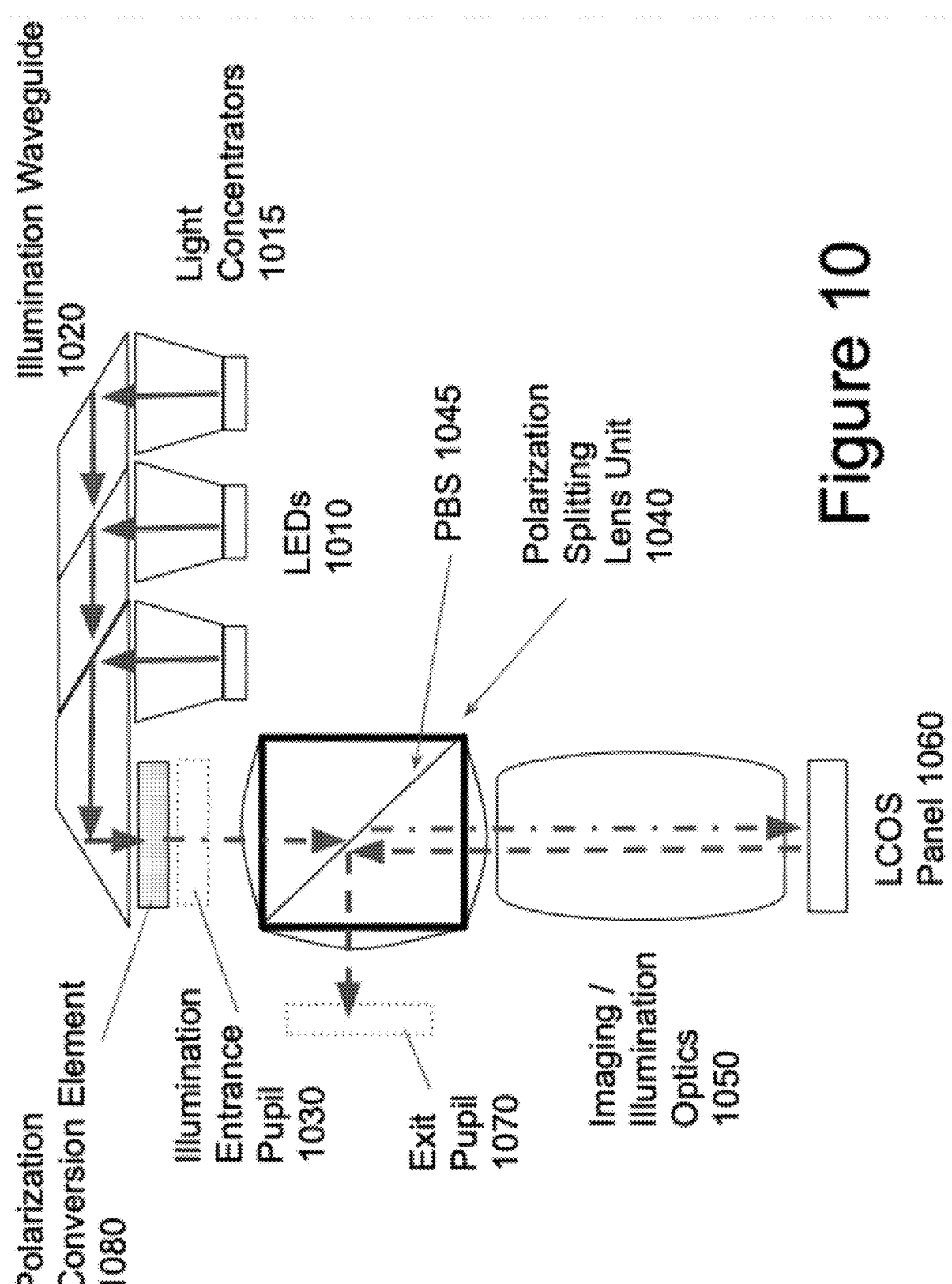
FIG. 10 is a diagram of one embodiment of using a polarization conversion element with a polarization splitting lens unit in a light engine.

FIG. 10 is a diagram of one embodiment of the polarization splitting lens unit using a polarization conversion element 1080 to convert the light from illumination waveguide 1020 to a single polarization state. The light exiting the illumination waveguide 1020 contains light in both polarization states, shown by the solid-line arrow. After passing through the polarization conversion element 1080, the light is converted into a single polarization state shown by the dash-dot lined arrow. This state passes through the PBS 1045 and is modulated by the LCOS panel 1060. The LCOS panel 1060 flips the polarization of the light, as shown by the dashed line, before passing it back through imaging/illumination optics 1050. The modulated light reflects off of the PBS 1045 just as in the other embodiments, to form exit pupil 1070. On the first pass through the polarization splitting lens unit 1040, there is almost no light in the second polarization state, due to polarization conversion element 1080, so it is not illustrated in the diagram. In one embodiment, the polarization conversion element 1080 is made up of one or more micro lens arrays and geometric phase lenses. In another embodiment the polarization conversion element 1080 utilizes Bragg reflection and a diffuse surface to convert the light into a single polarization state. Other polarization conversion configurations or recycling elements may be used.

Figure 11:
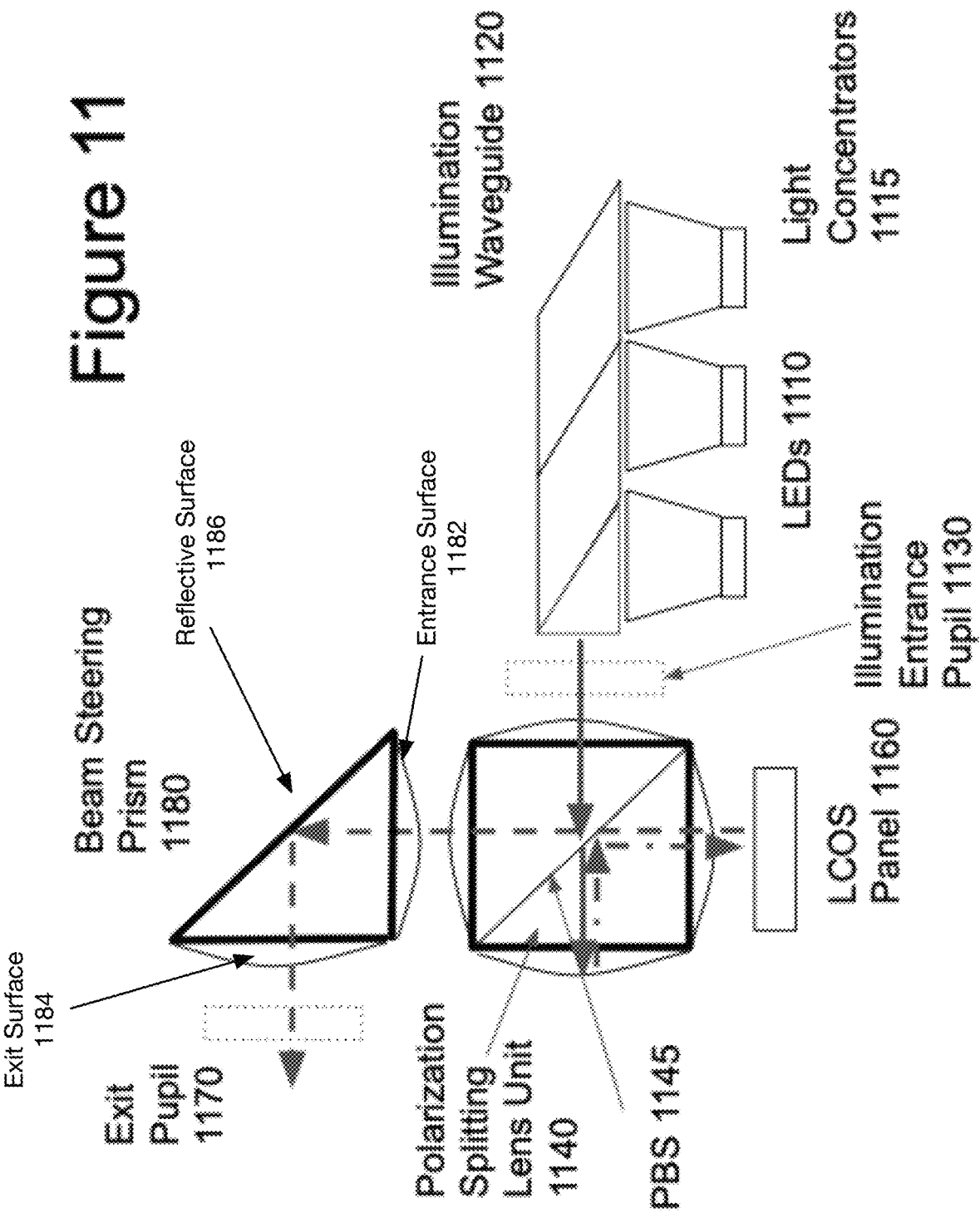
FIG. 11 is a diagram of one embodiment of the polarization splitting lens system with a beam steering prism in a light engine.

FIG. 11 is a diagram of one embodiment of the polarization splitting lens system with a beam steering prism. The light from LEDs 1110 is focused by light concentrators 1115 into illumination waveguide 1120. The output of illumination waveguide 1120 is the illumination entrance pupil 1130, directed into an entrance face of the polarization splitting lens unit 1140. The polarizing beam splitter (PBS) 1145 in polarization splitting lens unit 1140 directs light with the first polarization to LCOS panel 1160. The modulated light, with the opposite polarization, passes through the polarization splitting lens unit 1140, to beam steering prism 1180. Beam steering prism 1180 is used to direct the light to an exit pupil 1170.

In one embodiment, the beam steering prism 1180 may have an optical power applied to its entrance surface 1182, its exit surface 1184, or both surfaces 1182, 1184. The reflective surface 1186 of the beam steering prism 1180 in one embodiment is polarization sensitive, to reflect only light with one polarization. This may be used to clean up the outgoing light. The reflective surface 1186 in one embodiment is a TIR (total internal reflection) surface. The reflective surface 1186 in one embodiment may apply an optical power as well. The beam steering prism 1180 enables configuration flexibility, to direct the exit pupil 1170. Beam steering prism's interface angle, the angle between the entrance surface 1182 and the reflective surface 1186, in one embodiment is 45 degrees. In another embodiment, the interface angle may be set at another angle depending on face wrap angle or pantoscopic/retroscopic tilt. In one embodiment, the angle of the reflective surface 1186 may be a compound angle. The beam steering prism 1180 in one embodiment can also be rotated around the optical axis normal to the LCOS panel, to angle the exit pupil. The use of beam steering prism 1180 provides another degree of freedom in positioning the exit pupil 1170.

Figure 12:
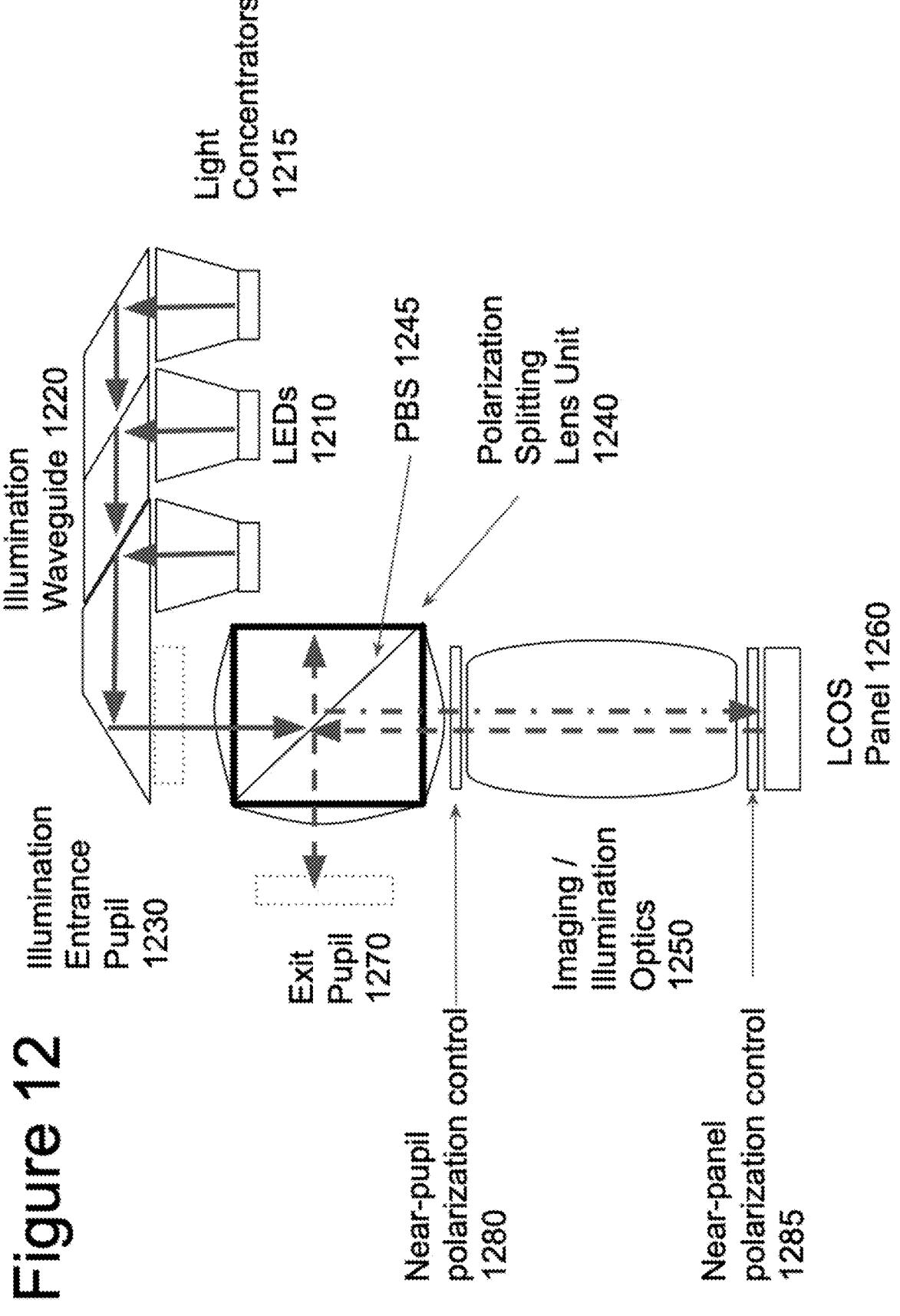
FIG. 12 is a diagram of one embodiment of the polarization splitting lens system with polarization control in a light engine.

FIG. 12 is a diagram of one embodiment of the polarization splitting lens system with polarization control. The light from LEDs 1210 is focused by light concentrators 1215 into illumination waveguide 1220. The output of illumination waveguide 1220 is the illumination entrance pupil 1230, directed into an entrance face of the polarization splitting lens unit 1240. The polarizing beam splitter (PBS) 1245 in polarization splitting lens unit 1240 passes the light with the first polarization to LCOS panel 1260. The modulated light, with the opposite polarization, is reflected by the PBS 1245, out of the polarization splitting lens unit 1240, to form exit pupil 1270.

In one embodiment, polarization control system includes near-pupil polarization control element 1280 and near-panel polarization control element 1285. In one embodiment, the polarization control system converts the light into circularly polarized light. Because the light is circularly polarized, it does not have alignment issues with the LCOS panel 1260. The light returning from the LCOS panel 1260 is converted back to linear polarization, in one embodiment, to be directed by the PBS 1245 to the exit pupil.

While the various embodiments showed different illumination subsystems, such as an illumination waveguide, X-cube light combiner, dichroic plates, dichroic elements, and RGB LEDs, one of skill in the art would understand that other methods to generate and direct light to the entrance pupil may be used. Similarly, the modifications and variations among the various embodiments shown may be combined in different ways. For example, the X-cube illuminator may be combined with the offset lens, or the U-fold design may be combined with the offset lens, a polarization conversion element or polarization control elements may be inserted into any of the configurations, etc. Furthermore, the change in the angle of the PBS in the polarization splitting lens unit, the rotation of the polarization splitting lens unit, and other configuration changes may be combined across the various embodiments illustrated.

Additionally, while the diagrams show lenses on all three faces of the polarization splitting lens unit, in some embodiments, some of the sides may have planar lenses, or no lenses. In some embodiments, the polarization splitting lens unit may apply no optical power to the light passing through it. Additionally, while the lenses on the face of the polarization splitting lens unit are illustrated as convex, the lenses may be convex or concave, spherical or aspherical, plano, or freeform. In one embodiment, some or all of the faces or lenses of the polarization splitting lens unit may be polarization or wavelength sensitive.

In the foregoing specification, the invention has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative rather than a restrictive sense.

We claim:

1. A light engine comprising:

an illumination subsystem to create an entrance pupil;

a system comprising:

a polarization splitting lens unit including an angled polarized beam splitter (PBS) and including an entry face, a double pass face, and an exit face, the polarization splitting lens unit positioned in proximity to the illumination subsystem; and imaging and illumination optics receiving light from the polarization splitting lens unit;

a display element modulating the light received from the imaging and illumination optics, and reflecting the light back through the imaging and illumination optics;

the polarization splitting lens unit receiving the modulated light from the imaging and illumination optics, and outputting the modulated light through the exit face forming an exit pupil.

2. The light engine of claim 1, wherein the polarization splitting lens unit is configured to off-set the exit pupil.

3. The light engine of claim 2, wherein the polarization splitting lens unit is rotated with respect to a normal to the exit face, to offset the exit pupil.

4. The light engine of claim 2, wherein the polarization splitting lens unit is tilted with respect to a normal to the exit face, to offset the exit pupil.

5. The light engine of claim 2, wherein the polarization splitting lens unit has a shaped exit face to offset the exit pupil.

6. The light engine of claim 2, wherein the polarization splitting lens unit has a lens on one or more of the entry face, the exit face, and the double pass face, and one or more of the lenses are shaped to offset the exit pupil.

7. The light engine of claim 2, wherein the PBS is at an angle other than 45 degrees to the entry face to offset the exit pupil.

8. The light engine of claim 1, further comprising:

a lens on one or more of the entry face, double pass face, and exit face, the lens to apply an optical power to the light.

9. The light engine of claim 1, wherein the illumination subsystem comprises one or more of:

an illumination waveguide;

an X-cube light combiner;

dichroic plates;

a dichroic element; or light emitting diodes and a light concentrator.

10. The light engine of claim 1, further comprising:

an entry lens applying a first optical power to the entry face of the polarization splitting lens unit;

a double pass lens applying a second optical power to the double pass face of the polarization splitting lens unit; and an exit lens applying a third optical power to the exit face of the polarization splitting lens unit.

11. The light engine of claim 10, wherein the entry lens and the exit lens are shaped to offset the light, such that the shaping of the exit lens provides an offset of the modulated light exiting through the exit face of the polarization splitting lens unit.

12. The light engine of claim 1, wherein the PBS is at a 45 degree angle to the display element.

13. The light engine of claim 1, wherein the PBS is at an angle between 20 degrees and 70 degrees to the display element.

14. The light engine of claim 1, wherein the polarization splitting lens unit is rotated around a Y-axis at a normal to the exit face, by between 1 degree and 25 degrees in either direction to produce an offset exit pupil.

15. The light engine of claim 1, wherein the exit face of the polarization splitting lens unit is shaped at an angle between 1 and 25 degrees.

16. A light engine comprising:

a polarization splitting lens unit including an angled polarized beam splitter (PBS) and including an entry face, a double pass face, and an exit face;

imaging and illumination optics receiving light from the polarization splitting lens unit;

a display element modulating the light received from the imaging and illumination optics, and reflecting the light back to the imaging and illumination optics;

the polarization splitting lens unit receiving the modulated light from the imaging and illumination optics, and outputting the modulated light through the exit face through an exit pupil;

wherein the polarization splitting lens unit is configured to output an exit pupil of offset from normal to the exit face.

17. The light engine of claim 16, wherein the exit pupil is offset by altering an angle of the PBS within the polarization splitting lens unit.

18. The light engine of claim 16, wherein the exit pupil is offset by rotating the polarization splitting lens unit with respect to the normal.

19. The light engine of claim 16, wherein the exit pupil is offset by tilting the polarization splitting lens unit.

20. The light engine of claim 16, wherein the exit pupil is offset by adding an offset to an exit face lens on the exit face of the polarization splitting lens unit.

21. The light engine of claim 20, wherein an entry face lens on the entry face of the polarization splitting lens unit is correspondingly offset, and the light enters the polarization splitting lens unit at an offset angle.

\* \* \* \* \*